US012737055B1

(12) United States Patent
Morrison et al.

(10) Patent No.: US 12,737,055 B1
(45) Date of Patent: Sep. 15, 2026

(54) SYSTEM AND METHOD FOR A THIN CAPACITIVE SPLIT KEYBOARD STACK INCLUDING A LIGHT-EMITTING DIODE (LED) LAYER AND LIGHT GUIDE LAYER AND METAL SUPPORT PLATE SEALED INPUT SURFACE

(71) Applicant: Dell Products LP, Round Rock, TX (US)

(72) Inventors: Jason Scott Morrison, Chadron, NE (US); Brandon Joel Brocklesby, Pflugerville, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/285,937

(22) Filed: Jul. 30, 2025

(51) Int. Cl.
*G06F 3/02* (2006.01)

(52) U.S. Cl.
CPC .................................... *G06F 3/021* (2013.01)

(58) Field of Classification Search
CPC .... G06F 3/021; G06F 3/0202; G06F 3/03547; G06F 3/041; G06F 3/016; G06F 3/0445; G06F 3/041662; H03K 17/9622; H03K 17/962; H03K 17/9631; H03K 2017/9634; H03K 17/964; H03K 17/9643; H03K 2217/96062
See application file for complete search history.

(56) References Cited

U.S. PATENT DOCUMENTS 9,665,181 B2 * 5/2017 Morrison et al. ....... G06F 3/021
10,496,208 B2 * 12/2019 Xu ...................... G06F 3/04144
10,860,112 B1 * 12/2020 Knoppert et al. ...... G06F 3/021
11,817,275 B2 11/2023 Wang et al.
12,061,748 B2 * 8/2024 Gajiwala et al. ....... G06F 3/021
2007/0199804 A1 8/2007 Joseph et al.
2009/0073128 A1 3/2009 Marsden
2011/0102326 A1 5/2011 Casparian et al.
2012/0228111 A1 9/2012 Peterson et al.
2014/0062684 A1 3/2014 Casparian et al.
2014/0097857 A1 4/2014 Hu
2014/0224633 A1 8/2014 Peterson et al.
2016/0195955 A1 7/2016 Picciotto et al.

(Continued)

FOREIGN PATENT DOCUMENTS

WO 2016/111876 A1 7/2016

*Primary Examiner* — Vinh T Lam

(74) *Attorney, Agent, or Firm* — Prol Intellectual Property Law, PLLC; H. Kenneth Prol

(57) ABSTRACT

A keyboard having a split keyboard structure includes a first removable tactile input layer to receive input from a user and installed on a sealed input surface of a keyboard chassis for an information handling system with a keyboard sensing hardware structure formed below the sealed input surface to detect capacitive changes of the user input above the sealed input surface. The keyboard sensing hardware structure including capacitive pad sensors, shielding pads, and a plurality of light emitting diodes (LEDs) formed coplanar with the capacitive pad sensors. The sealed input surface including a light guide layer and a metal support plate formed over a keyboard sensing hardware structure on a non-conductive substrate. The metal support plate includes a plurality of holes to pass light upwards through the light guide layer of the sealed input surface into the first removable tactile input layer.

20 Claims, 11 Drawing Sheets

(56) References Cited

U.S. PATENT DOCUMENTS

| | | | | |
|---|---|---|---|---|
| 2018/0217668 | A1 | 8/2018 | Ligtenberg et al. | |
| 2018/0217669 | A1 | 8/2018 | Ligtenberg et al. | |
| 2018/0218859 | A1* | 8/2018 | Ligtenberg et al. .... | G06F 3/021 |
| 2020/0257375 | A1* | 8/2020 | Degner et al. .......... | G06F 3/021 |
| 2020/0278747 | A1 | 9/2020 | Ligtenberg et al. | |
| 2021/0165513 | A1 | 6/2021 | Liu et al. | |
| 2021/0407748 | A1 | 12/2021 | Wang et al. | |
| 2022/0326777 | A1 | 10/2022 | Ligtenberg et al. | |
| 2023/0333658 | A1 | 10/2023 | Ligtenberg et al. | |
| 2024/0047156 | A1 | 2/2024 | Wang et al. | |
| 2024/0361813 | A1* | 10/2024 | Radloff et al. .......... | G06F 3/021 |
| 2025/0044874 | A1 | 2/2025 | Ligtenberg et al. | |

* cited by examiner

SYSTEM AND METHOD FOR A THIN CAPACITIVE SPLIT KEYBOARD STACK INCLUDING A LIGHT-EMITTING DIODE (LED) LAYER AND LIGHT GUIDE LAYER AND METAL SUPPORT PLATE SEALED INPUT SURFACE

FIELD OF THE DISCLOSURE

The present disclosure generally relates to a system and method for detecting human user input via capacitive sensing contactlessly at a split-keyboard stack structure for an information handling system that has keyboard sensing hardware structure formed under a sealed interface surface of a keyboard chassis from a removable tactile input layer installed above the sealed input surface. The present disclosure more specifically relates systems and methods for the split keyboard stack structure with the keyboard sensing hardware structure having an LED layer and capacitive pads layer formed under a sealed interface surface that has a metal support plate and light guide for contactless sensing of keypress inputs, touch inputs and touchless gesturing inputs for at an information handling system at the removable tactile input layer with illumination through the sealed input surface.

BACKGROUND

As the value and use of information continues to increase, individuals and businesses seek additional ways to process and store information. One option available are information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications such as fand teleconferencing, word processing, sales systems, business software, gaming applications, and the like. In some embodiments, a user interface via a keyboard or other input/output (I/O) may be used with an information handling system for access and input commands.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
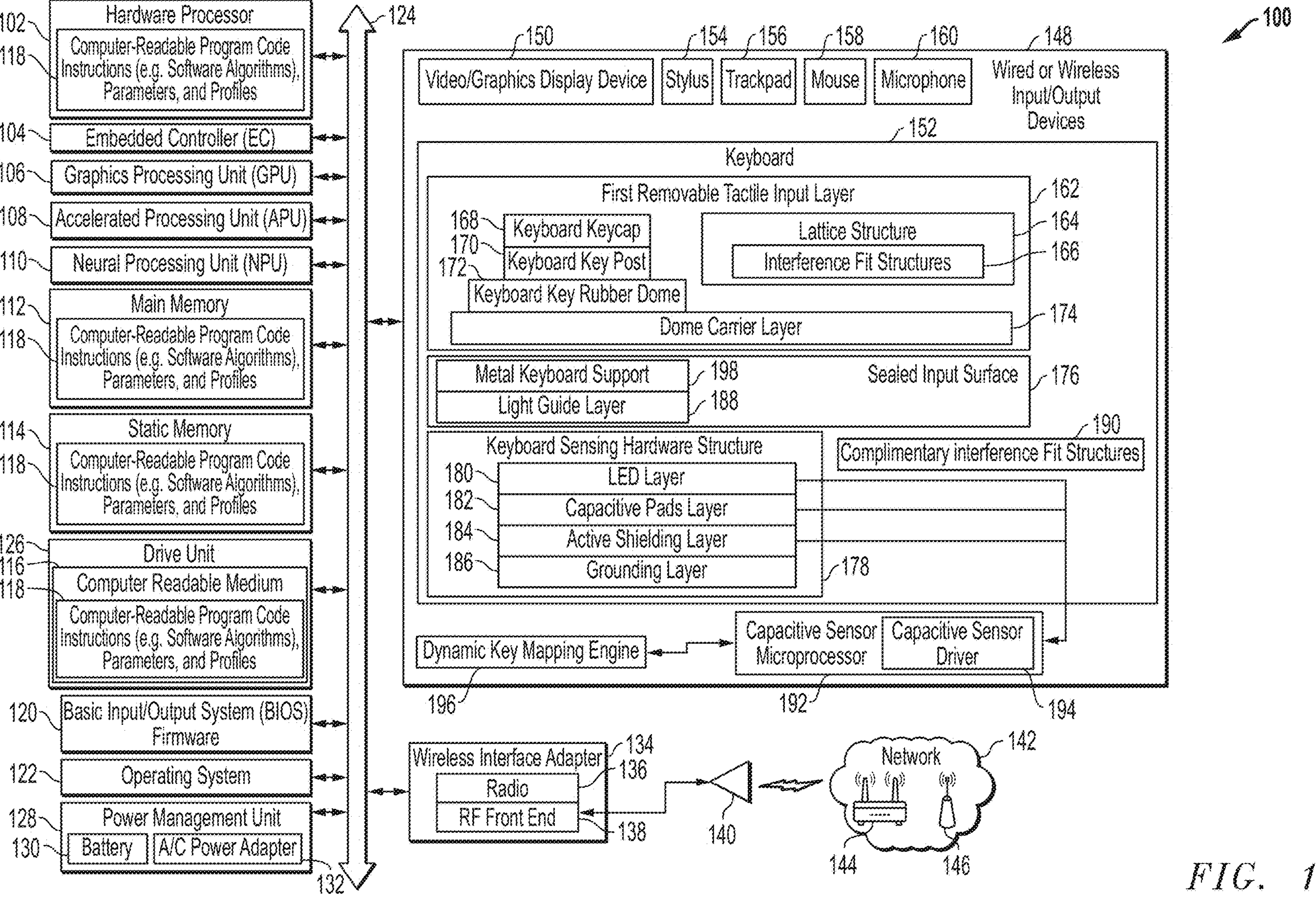
FIG. 1 is a block diagram illustrating an information handling system that includes a split keyboard stack structure having a removeable tactile input layer and a separate sealed input surface sealed using a light guide layer and metal support plate to receive touch and gesture input from a user contactlessly at capacitive sensor pads in a keyboard sensing hardware structure formed under the sealed input surface according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may include one or more input/output (I/O) devices for receiving user input and which may include a keyboard, a touchpad, a gesture sensing device such as a camera or infrared camera among other I/O devices. Laptop-type information handling systems include a built-in keyboard. These built-in keyboards are integrated into a base portion of the laptop-type information handling system. During operation of the information handling system, the user may accidentally spill liquids onto the keyboard which may damage the internal electrical connections within the keyboard. As liquids may damage the electrical components of the keyboard, the introduction of liquid onto the keyboard would require subsequent repair of the keyboard. Such a repair would require opening of the housing of the base portion of the information handling system to replace the damaged keyboard. Additionally, the introduction of liquid onto the keyboard portion of the base housing may also create damages to those other components within the base portion of the laptop-type information handling system. This is because current keyboards are not sufficiently designed to include a liquid barrier to the underlying keyboard components or these other computer hardware components within the base housing of the laptop-type information handling system.

It is also true that current keyboards include mechanical elements and electrical elements associated with each of the keys. These mechanical and electrical elements may include dome switches, scissor mechanisms, flexible printed circuit board traces, contact pads, contact switches, and the like. Those mechanical and electrical features may degrade over time with repeated physical contact. This may result in individual keys or a series of keys being inoperable. Costs associated with these mechanical elements and the electrical elements associated with those mechanical elements may be expensive as well or may simply cause an entire keyboard to need to be replaced. The mechanical and electrical failure of these mechanical and electrical elements may, again, result in the need to replace the whole keyboard or the entire laptop information handling system increasing costs to consumers of such laptop-type information handling systems as well as generating waste and cost.

The present specification describes a keyboard that may be part of a laptop-type information handling system that has a split keyboard structure. The split keyboard stackup structure may include a purely mechanical removable tactile input layer that a user may interact with and use to provide user input to the laptop-type information handling system and a keyboard sensing hardware structure formed under a sealed input surface of a keyboard chassis that contactlessly and capacitively detects the user input. The removable tactile input layer may include only mechanical parts that provide tactile feedback to the user in order to simulate providing input at a keyboard. The sealed input surface of the keyboard chassis may include keyboard sensing hardware structure formed underneath with embedded sensing technologies that detect keystrokes made on the removable tactile input layer that is installed above the sealed input surface. These embedded sensing technologies in the keyboard sensing hardware structure may include, in embodiments herein, a plurality of capacitive pad sensors in a capacitive pads layer, a shielding layer comprising a plurality of shielding pads formed vertically below the plurality of capacitive pad sensors, and a grounding layer of the keyboard sensing structure formed under a sealed input surface.

In an embodiment, the sealed input surface may include a light guide layer and metal support plate formed over the keyboard sensing hardware structure to transmit light from the plurality of LEDs through apertures in the metal support plate and upwards into the first removable tactile input layer installed on the sealed input surface of the keyboard chassis for the information handling system. The metal support plate and light guide layer or membrane form the sealed input surface to seal out moisture from the keyboard chassis of the information handling system. The metal support plate may form structural support and provide structural support for the removable tactile input layers, including support structures for mechanical keyboard keys of any keyboard on the removable tactile input layer. The metal support structure has holes or apertures formed under each key of a keyboard type removable tactile input layer which may be covered with the light guide layer to maintain a sealed input surface but permit illumination from light-emitting diodes (LEDs) below up through the removable tactile input layer. Thus, in the embodiments herein, the light guide layer may form or be part of the sealed input surface that prevents contamination or liquid damage to those hardware devices within the base chassis of the laptop-type information handling system. This allows for a plurality of LEDs to be placed coplanar with the capacitive pad sensors of the capacitive pads layer. In an embodiment, the LEDs may be formed onto a multi-layer flexible printed circuit board (PCB) or a thin, two-sided membrane with electronics or traces sputtered or deposited thereon. The LEDs may be formed alongside or coplanar to the plurality of capacitive pad sensors on the flexible PCB or two-sided membrane that forms a keyboards sensing hardware structure substrate. In an embodiment, the LEDs may be formed onto a top surface of a first layer of the multi-layer flexible PCB or two sided membrane with the plurality of capacitive pad sensors.

In an embodiment, a hardware processing device of the information handling system such as a capacitive sensor microprocessor may execute machine readable program code instructions that detect user gestures and touch at a keyboard of the information handling system. The information handling system may comprise a hardware processor, a data storage device, and a power management unit (PMU) to provide power to the hardware processor and data storage device with the data storage device storing any machine readable program code instructions described herein.

In an embodiment, each of the plurality of capacitive pad sensors may be operatively coupled to a capacitive sensor microprocessor executing machine readable program code of a capacitive sensor driver that can determine when various capacitive thresholds are reached that may indicate a press of a key on the removable tactile input layer, user touch inputs in keyboard keys or other surfaces of the removable tactile input layer, hovering of a user's fingers over any given key or surface of the removable tactile input layer, and/or touchless gesture inputs above the surface of the removable tactile input layer.

In an embodiment, because the removable tactile input layer is separate from the sealed input surface and the keyboard sensing hardware structure formed on the substrate thereunder, the removable tactile input layer may be secured to the surface of the sealed input surface via a latching mechanism, interference fit structures, magnetic mechanism, fasteners, or other securing structures. For example, a lattice structure comprising interference fit structures that snap into complimentary interference fit structures formed within a recessed housing well that may be formed in a top cover of a base chassis or keyboard chassis portion of the information handling system defining an area where the sealed input surface of split keyboard structure is formed. This allows the removable tactile input layer to be selectively removed and replaced with another removable tactile input layer within the recessed housing well such a new or different key layout and/or input device may be installed on the keyboard chassis of the information handling system without replacing the underlying detection electronics of the keyboard sensing hardware structure.

Because the removable tactile input layer may be swapped out for a different removable tactile input layer such as a removable tactile input layer that includes a different key layout, the information handling system may also include a capacitive sensor microcontroller that executes machine readable program code instructions of a dynamic key mapping engine configured to dynamically assign keyboard functions to specific pad sensor locations based on user-defined layouts. A sensor on the keyboard sensing hardware structure under the sealed input surface, such as hall sensors, radiofrequency identification sensors, capacitive coding sensors, or others may identify the type of removable tactile layer installed above the sealed input surface. This results in the removable tactile input layer being user-replaceable and modular with allows for easy, cost-effective, repairs or replacements without having to open up a housing of the base portion of the laptop-type information handling systems or replace the keyboard or input/output device electronics.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Machine readable code instructions stored in main memory 112 (e.g., RAM) may be accessible by hardware processing resources using that main memory 112. Machine readable program code instructions stored in static memory 114, main memory 112, or drive unit 126 may be involved in invoking such machine readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a keyboard 152, a video/graphics display device 150, a microphone 160, or any combination thereof. Further, various wired or wireless input and output (I/O) devices 148, such as a microphone 160, speaker 168, a trackpad 156, a stylus 154, a keyboard 152, a video/graphics display device 150, mouse 158, or any combination thereof may be integrated into the chassis of the information handling system 100 in other embodiments. Portions of an information handling system 100 may themselves be considered information handling systems 100.

Information handling system 100 may include devices or modules that embody one or more of the devices or execute instructions for one or more systems and modules. The information handling system 100 may execute machine readable program code instructions (e.g., software algorithms) parameters, and profiles 118 that may operate on servers or systems, remote data centers, or on-box in individual client information handling systems according to various embodiments herein. In some embodiments, it is understood that any or all portions of machine readable program code instructions (e.g., software algorithms) parameters, and profiles 118 may operate on a plurality of information handling systems 100.

The information handling system 100 may include the hardware processor 102 such as a central processing unit (CPU) or other hardware processing resources (e.g., 104, 106, 108, 110). Any of the hardware processing resources may operate to execute machine readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with machine readable medium 116 storing machine readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, a mouse 158, video/graphics display device 150, stylus 154, trackpad 156, microphone 160, or speaker among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes machine readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing machine readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a non-transitory machine readable medium that includes machine readable program code instructions, parameters, and profiles 118 or receives and executes machine readable program code instructions, parameters, and profiles 118 responsive to a propagated signal, so that a hardware device connected to a network 142 may communicate voice, video, or data over the network 142. Further, the machine readable program code instructions, parameters, and profiles 118 may be transmitted or received over the network 142 via the network interface device or wireless interface adapter 134.

The information handling system 100 may include a set of machine readable program code instructions, parameters, and profiles 118 that may be executed to cause the computer system to perform any one or more of the methods or computer-based functions disclosed herein. For example, machine readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application machine readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a non-transitory machine readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain non-transitory machine readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain non-transitory machine readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the machine readable medium is shown to be a single medium, the term "machine readable medium" includes a single medium or multiple media, such as a centralized or distributed database, and/or associated caches and servers that store one or more sets of machine-readable code instructions. The term "machine readable medium" shall also include any non-transitory machine readable medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, a video/graphic display device 150, or other wired or wireless I/O devices 148 such as the mouse 158, the stylus 154, the keyboard 152, microphone 160, and the trackpad 156 and other components that may require power when a power button has been actuated by a user. In an embodiment, the PMU 128 may monitor power levels and power may be electrically coupled to the information handling system 100 via various ports in embodiments herein to provide this power. The PMU 128 may be coupled to the bus 124 to provide or receive data or machine-readable code instructions. The PMU 128 may regulate power from a power source such as the battery 130, or AC power adapter 132 such as from one or more ports. In an embodiment, the battery 130 may be charged via the AC power adapter 132 and provide power to the components of the information handling system 100 when AC power from the AC power adapter 132 is removed.

In a particular non-limiting, exemplary embodiment, the machine readable medium can include a solid-state memory such as a memory card or other package that houses one or more non-volatile read-only memories. Further, the machine readable medium can be a random-access memory or other volatile re-writable memory. Additionally, the machine readable medium can include a magneto-optical or optical medium, such as a disk or tapes or other storage device to store information received via carrier wave signals such as a signal communicated over a transmission medium. Furthermore, a non-transitory machine readable medium 116 can store information received from distributed network resources such as from a cloud-based environment. A digital file attachment to an e-mail or other self-contained information archive or set of archives may be considered a distribution medium that is received by and stored in a tangible non-transitory machine readable storage medium. Accordingly, the disclosure is considered to include any one or more of a machine readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a keyboard 152 used by a user to provide input to the information handling system 100. In the context of the present specification, the information handling system 100 may be a laptop-type information handling system 100 that includes a base portion and a lid portion. The base portion may be referred to herein as a base chassis or keyboard chassis. The lid portion may be referred to has a lid chassis or display chassis. A housing of the lid portion, in an embodiment, may be a lid chassis to house the video/graphics display device 150 described herein. The base portion may be a keyboard chassis where the keyboard 152 is formed giving the user the ability to provide input to the information handling system 100.

The keyboard 152 may be a keyboard 152 that has a split keyboard stack structure which includes a removeable tactile input layer 162 operatively coupled to a sealed input surface 176. The removeable tactile input layer 162 may be the layer that a user interacts with to provide input to the information handling system 100. This removeable tactile input layer 162 may include only mechanical elements such as mechanical keyboard keys that each includes a keyboard keycap 168, a keyboard key post 170, and a keyboard key rubber dome 172 that provides tactile response to the user when the mechanical keyboard keys are pressed or other I/O interface structures such as touch areas. The first removable tactile input layer 162, which may be one among a plurality of swappable and removable tactile input layers 162, may not have any associated electronics. As such, a user's finger or movement of mechanical keyboard keys may affect capacitance detected in the keyboard sensing hardware structure 178 formed under a sealed input surface 176. This may be done by using a capacitive pads layer 182 formed under the sealed input surface 176 with plural capacitive sensor pads having capacitive sensing fields which are interrupted or changed by the user's finger or hand or a key is actuated in embodiments herein.

In a specific examples, the removeable tactile input layer 162 may include one or more keyboard keys that each include a keyboard keycap 168 operatively coupled to a keyboard key rubber dome 172 or popple via a keyboard key post 170 forming each of the mechanical keyboard keys. These keyboard keys may be formed in a tray, grid, or other support structure and formed of a suitable material. In an example embodiment, a lattice structure 164 may be placed around the plurality of keyboard keys and may form a layer within the first removable tactile input layer 162. As described herein, the lattice structure 164 may be used to locate and secure the first removable tactile input layer 162 to the keyboard 152 and above the sealed input surface 176.

As described herein, a plurality of removable tactile input layers 162 with various keyboard structure layouts or other input/output (I/O) devices may be installed and operated with the keyboard sensing hardware structure 178 formed under the sealed input surface 176 of the base chassis of information handling system 100 in embodiments herein. In this example embodiment, instead of the keyboard key rubber dome 172 having a switch or activating a switch on a printed circuit board (PCB), the keyboard keycap 168 and keyboard key rubber dome 172 may be used to help provide location of a keyboard key in the removeable tactile input layer 162 and over the keyboard sensing hardware structure 178 formed under the sealed input surface 176 as well as provide tactile feedback to the user. No physical engagement with keypress sensing electronics is required in the removeable tactile input layer 162 and, accordingly, the removable tactile input layer 162 is easily removable and replaceable for any of a plurality of removable tactile input layers 162 that can be replaced and used with the keyboard sensing hardware structure 178 formed under the sealed input surface 176. In this example embodiment, the removeable tactile input layer 162 may also include scissor or butterfly arms that also provide tactile feedback to the user while facilitating the recoil of the keycap upwards for tactile feedback of a keypress to a user. However, the removable tactile input layer 162 does not include any electrical elements that are used to receive electrical signals as the user presses the keyboard keys. As such, in the embodiments herein, the removable tactile input layer 162 does not include a PCB layer, a flexible PCB layer, or other electrical components that other keyboards may use to detect the press of a keyboard key by the user. Instead, in the embodiments herein, the split-keyboard structure of the keyboard 152 includes the keyboard sensing hardware structure 178 formed under the sealed input surface 176 where those keypress strokes of the keyboard keys on the removable tactile input layer 162 are capacitively detected and, therefore, contactlessly sensed by the keyboards sensing hardware structure 178 formed under the sealed input surface 176.

In an embodiment, the removeable tactile input layer 162 may further include a dome carrier layer 174. The dome carrier layer 174 may be any surface that allows for light to pass up and into the removeable tactile input layer 162 as well as serve as a structure onto which the keyboard key rubber domes 172 may be placed or installed on the underside of the removable tactile input layer 162. In an example embodiment, the dome carrier layer 174 may be made of a plastic that is transparent or translucent. In an embodiment, the dome carrier layer 174 may be made of a translucent material that scatters or diffuses a light emitted from one or more light-emitting diodes (LEDs) of a LED layer 180 formed below the sealed input surface 176. This may create a lighted backlight for the keyboard 152 despite the split-keyboard structure described herein.

In an embodiment, the removeable tactile input layer 162 may further include a lattice structure 164. The lattice structure 164 may be formed around each of the keyboard keycaps 168 of each keyboard keys and installed around the keyboard keys on the keyboard 152 and over a removable tactile input layer support frame. In an embodiment, the lattice structure 164 may be made of a rigid material such as a plastic. The lattice structure 164 may be used to secure the removeable tactile input layer 162 into a recessed housing well formed into a c-cover of the base chassis of the laptop-type information handling system with the removeable tactile input layer 162 may be maintained within the recessed housing well in some embodiments. It is appreciated that the lattice structure 164 may include any latching mechanism, interference fit structures 166, magnetic structures, or the like to secure the removeable tactile input layer 162 into this recessed housing well. As described herein, in specific example embodiments, the lattice structure 164 may include interference fit structures 166 that engage with complementary interference fit structures 190 formed within this recessed housing well such that the interference fit structures 166 may snap the lattice structure 164 and first removable tactile input layer 162 into place when they engage within the complementary interference fit structures 190 in the recessed housing well.

The keyboard sensing hardware structure 176 formed under the sealed input surface 176 may include a plurality of layers used to detect those keypress keystrokes, via capacitive sensing, during actuation of keyboard keys on the removable tactile input layer 162 of the split-keyboard structure above the sealed input surface 176. In an embodiment, the sealed input surface 176 may be sealed such that liquids, dust, and other contaminants cannot enter into the base portion of the information handling system 100. This prevents those contaminants from damaging those hardware elements formed into the housing of the base portion of the information handling system 100.

In an example embodiment, the sealed input surface 176 may include a light guide layer 188 formed under a metal keyboard support 198 that is used to seal those layers of the keyboard sensing hardware structure 178 to prevent damage due to contaminates and liquids that may be introduced on the first removable tactile input layer 162, albeit accidentally. In an embodiment, the light guide layer 188 may be placed within the recessed housing well to form a base surface or area within recessed housing well in the c-cover of the base chassis of the information handling system and secured to the c-cover using an adhesive, for example. In an embodiment, the metal keyboard support 198 formed of a metal such as aluminum may also be placed within the recessed housing well to form the base surface or base area within recessed housing well in the c-cover of the base chassis of the information handling system for added structural support and also may be secured to the c-cover using an adhesive, for example. The light guide layer 188 may serve as, at least, a portion of the sealed input surface 176 as well as a light transmission structure through which light emitted from the LEDs in the LED layer 180 can be transmitted up and into the removeable tactile input layer 162 as described herein. In order to allow for light transmission, the metal keyboard support 198 placed above the light guide layer 188 may include a plurality of holes through which light emitted from the LEDs may pass. These holes or apertures in the metal keyboard support 198 may be formed under location of keyboard keys when a removable tactile input layer 162 is installed above the sealed input surface 176. In an embodiment, the holes may be placed at locations in the metal keyboard support 198 where light may be passed up towards the keyboard keycaps 168 such that they may illuminate those keys of the keyboard. In an alternative embodiment, a hole may be formed in the metal keyboard support 198 below each of the keyboard keys of the keyboard such that each keyboard key is illuminated by the LEDs passing light through the light guide layer 188 that extends across those holes to fully seal the sealed input surface 176 across the base floor or area of the recessed housing well. In an embodiment, the metal keyboard support 198 may be fixed to the top surface of the light guide layer 188 such that the holes formed through the metal keyboard support 198 do not allow contaminates or liquids to pass into the base housing of the chassis due to the light guide layer 188 being affixed to the bottom surface of the metal keyboard support 198. In this way, the metal keyboard support 198 may provide structural support for the removable tactile input layer 162 and its structural frame as well as any lattice structure 164 installed in the recessed housing well to provide for rigidity in securing the removable tactile input layer in an embodiment. Further, the metal keyboard support 198 provides for structural integrity of the sealed input surface 176 serving as a top surface of the keyboard chassis. This provide additional mechanical support and electromagnetic interference (EMI) shielding for information handling system hardware components disposed below the keyboard sensing hardware structure 178 within the keyboard chassis of the information handling system.

In an example embodiment, the keyboard sensing hardware structure 176 formed under the sealed input surface 176 may include a capacitive pads layer 182. The capacitive pads layer 182 includes a plurality of capacitive sensor pads each having a capacitive sensing field that may correspond to each or a plurality of the keyboard keys in the removable tactile input layer 162 to detect capacitive changes in that capacitive sensing field due to actuation of those keyboard keys of the removable tactile input layer 162 above the sealed input surface 176 of a chassis of the information handling system. Further, the capacitive pads layer 182 includes a plurality of capacitive sensor pads having a capacitive sensing field or grouped to have a combined capacitive sensing field to detect capacitive changes due to touch input by a user's fingers one keys or I/O structures on the removable tactile input layer above the sealed input surface 176 in an embodiment. In yet another embodiment, the capacitive pads layer 180 may include the plurality of capacitive sensor pads having a capacitive sensing field or grouped to have a combined capacitive sensing field that may detect capacitive changes due to sensing proximate location of the user's body part, including fingers or hand for a touchless gesture, above those keyboard keys of the removable tactile input layer 162 and above the sealed input surface 176 of the chassis of the information handling system.

In an embodiment, these capacitive sensor pads may be made of deposited carbon pads which may be delicate but are protected and sealed under the sealed input surface 176 (e.g., including the light guide layer 188 and metal keyboard support 198) of the chassis of the information handling system 100 for the keyboard sensing hardware structure 178. The deposited carbon capacitive sensor pads of the capacitive pads layer 182 have a benefit of very low cost and simple manufacturing via deposition or masked spraying to form these deposited carbon capacitive sensor pads. In an embodiment, these capacitive sensor pads of deposited carbon may be configured to vary an electric field in response to changes in nearby capacitance. These carbon-based patches may be arranged in a sensor matrix of capacitive sensor pads and may be printed, sputtered, or otherwise deposited on a non-conductive keyboard sensing hardware structure substrate such as an acrylonitrile butadiene styrene (ABS) polymer surface, the underside of the light guide layer 188, or on a printed circuit board (PCB) or flexible PCB at very low cost. In an embodiment, the array of deposited carbon patches for the capacitive sensor pads in the capacitive pads layer 182 may be arranged such that each keyboard key of the removable tactile input layer 162 aligns vertically over the sealed input surface 178 with a deposited carbon patch capacitive sensor pads of the keyboard sensing hardware structure 178 formed under the sealed input surface 176 in embodiments herein. In an alternative embodiment, a single deposited carbon patch of the capacitive pads layer 182 may be formed under multiple keyboard keys or under a single input device such as a touchpad or trackpad 156, for example.

In an embodiment, herein, the deposited carbon patches of the capacitive pads layer 182 may be formed on a top surface of a first layer of a multi-layer flexible PCB, on a thin two-sided membrane (e.g., polyethylene terephthalate (PET) membrane), or on another non-conductive keyboard sensing hardware structure substrate formed below the sealed input surface 176. In an embodiment, the LEDs such as mini-LEDs or micro-LEDs of the LED layer 180 may also be formed on the top surface of the first layer of the multi-layer flexible PCB or top surface of the thin two-sided membrane or other non-conductive keyboard sensing hardware structure substrate thereby forming a layer within the keyboard sensing hardware structure 178 where the LEDs are coplanar to the deposited carbon patches of the capacitive pads layer 182.

The location of the deposited carbon patches of the capacitive pads layer 182 directly below the light guide layer 188 and aligned with holes in the metal keyboard support plate 198 allows for the deposited carbon patches of capacitive sensor pads to be located very close to the removeable tactile input layer 162 and the user's fingers and hands. In an embodiment, the distance between the keyboard keycap 168 where a user's finger or hand may be detected by the capacitive sensor pads and a system plate (e.g., a sensing support plate) formed below the capacitive sensor pads may be between 4-5 mm (e.g., 4.6 mm) thereby being located well within the capacitive sensing field for detecting a capacitive differential that will better detect the presence of the user's hand and fingers even where the fingers and hands are not physically touching the keyboard keycap 168. This also results in a high press/touch/no-press capacitive change level differentiation detection being available at the deposited carbon patches. The high differentiation in detection of the user's fingers and hands results in a higher signal-to-noise ratio (SNR) that allows a capacitive sensor microprocessor 192 executing machine readable code instructions of a capacitive sensor driver 194 to operate at a relatively low sensitivity setting. Further, the location of the deposited carbon patches close to the user's fingers and hands also reduces the interference and capacitive radiation that may otherwise be detected at the deposited carbon patches. Still further, this arrangement of the deposited carbon patches of the capacitive pads layer 182 close to the removeable tactile input layer 162 decreases the thickness of the keyboard 152 resulting in a thinner base chassis of the information handling system 100 while still providing for structural strength with the metal keyboard support plate 198 in the sealed input surface 176 on the keyboard chassis of the information handling system 100.

As described in embodiments herein, each of the plurality of capacitive sensor pads in the capacitive pads layer 182 may be operatively coupled to a capacitive sensor microprocessor 192 executing machine readable code instructions of a capacitive sensor driver 194. In an embodiment, each of the deposited carbon patches that form the plurality of capacitive sensor pads of the capacitive pads layer 182 may be operatively coupled to the capacitive sensor microprocessor 192 via carbon traces formed on the top surface of the first layer of a multi-layer flexible PCB, on a top surface of the two-sided thin membrane, or on another non-conductive keyboard sensing hardware structure substrate. It is also appreciated that other types of traces may be formed to operatively couple the carbon pads to the capacitive sensor microprocessor 192 executing machine readable code instructions of the capacitive sensor driver 194 such as silver trances, copper traces, and/or indium tin oxide (ITO) that allow each of the deposited carbon patches or pads to conduct signals for capacitive level changes to the capacitive sensing fields to the capacitive sensor microprocessor 192 for determination of a particular keypress of a keyboard key, determination of a user's touch input, and/or determination of a user's touchless gesture input at or near the keyboard keys or other I/O surfaces the removable tactile input layer 162 for the split-keyboard structure. The capacitive sensor driver 194 may be executed by the capacitive sensor microprocessor 192 to detect and determine which of the plurality of keys on the removable tactile input layer 162 have been pressed and detected at each of the plurality of capacitive sensor pads based on location and a detected level of capacitance change. The capacitive sensor microprocessor 192 executing the machine readable code instructions of the capacitive sensor driver 194 may relay these inputs to the hardware processor 102 for processing of keystrokes as input to the information handling system 100 in embodiments herein.

In some embodiments, the keyboard sensing hardware structure 178 may include an active shielding layer 184 to shield the plurality of capacitive sensor pads (e.g., the deposited carbon patches) within the capacitive pads layer 182 from a grounding layer 186 serving as an electromagnetic interference (EMI) and grounding source for the split-keyboard structure. The grounding layer 186 may operate as an EMI shield for information hardware components within the keyboard chassis under the sealed input surface 176. In an embodiment, the active shielding layer 184 may be operatively coupled to a voltage source as controlled by the capacitive sensor microprocessor 192 such that the voltage level of the active shielding pads in the active shielding layer 184 is held at about that of the capacitive sensor pads of the capacitive pads layer 180. Active shielding pads of the active shielding layer 184 held at a voltage similar to that of the capacitive sensing pads prevent parasitic capacitive grounding of the capacitive sensor pads by the grounding layer 186 by requiring the capacitive sensing fields to go around the active shielding pads to reach the grounding layer 186. This grounding layer 186 is used for split-keyboard structure grounding and EMI and noise shielding but, due to the thin profile of the keyboard sensing hardware structure formed under the sealed input surface 176, is potentially close to the capacitive pads layer 182 which may disrupt the operation of the plurality of capacitive sensor pads (e.g., carbon pads) within the capacitive pads layer 182 via this parasitically grounding capacitance of those capacitive sensor pads from detecting other capacitive changes due to user inputs. The active shielding layer 184 may be driven using the same voltage as the plurality of capacitive sensor pads within the capacitive pads layer 182 in some embodiments. This reduces parasitic capacitance between the plurality of capacitive sensor pads of the capacitive pads layer 182 and the grounding layer 186 placed below the active shielding layer 184. Thus, the active shielding layer 184 further improves SNR and extends capacitive sensing range of the plurality of capacitive sensor pads of the capacitive pads layer 182 in the keyboard sensing hardware structure formed under the sealed input surface 176.

As described, in some embodiments, the keyboard sensing hardware structure 178 may also include the grounding layer 186 to prevent EMI interference and provide a stable electrical reference for the active circuitry of the keyboard sensing hardware structure 178 formed under the sealed input surface 176. It is appreciated that other hardware components of the information handling system 100 may be placed below the grounding layer 186 that may include an information handling system hardware mainboard that may house the hardware processor 102, other processing devices (e.g., 104, 106, 108, 110), the PMU 130, the wireless interface adapter 134, the radio 136, the RF front end 138, and the antenna 140 among other hardware components. Thus, the grounding layer 186 may prevent any EMI and noise from those hardware components also from affecting other nearby electronic devices to the information handling system 100.

In an embodiment, the capacitive sensor microprocessor 192 may execute machine readable code instructions of a dynamic key mapping engine 196. The dynamic key mapping engine 196 may, upon switching types of removeable tactile input layers 162 such that the key layout is different, provide for operation of the newly installed removable tactile input layer 162 with the keyboard sensing hardware structure 178 formed under the sealed input surface 176. For example, a user may switch from a QWERTY-type keyboard layout of a first removable tactile input layer 162 to other types of keyboard key layouts that include, for example, Dvorak simplified keyboard, a Colemak keyboard, AZERTY keyboard, a QWERTZ keyboard, a Japanese Industrial Standard (JIS) keyboard, Hangul keyboard, and other language-specific layouts, region-specific layouts, task-specific layouts, and specialized keyboard layouts. Each of these different layouts of the various removable tactile input layers 162 may be detected using various detection devices including dedicated carbon patches, magnets, optical markers, near field (NFC) tags, radiofrequency identification (RFID) tags and the like that are placed on the underside of the removable tactile input layer 162 and detectable by sensors placed below the sealed input surface 176. By detecting the removable tactile input layer detection devices, the capacitive sensor microprocessor 192, executing the dynamic key mapping engine 196, may know the layout of the keyboard keys of the installed removable tactile input layer 162 and assign each of the plurality of capacitive sensors in the capacitive pads layer 182 the appropriate input characteristics based on the detected type of keyboard layout on the installed removable tactile input layer 162.

The systems and methods described herein, therefore, provide for a split-keyboard structure that can operate even when contaminants are accidentally introduced into the removable tactile input layer 162 such as liquids. If damaged, the mechanical keyboard keys of the removable tactile input layer 162 may be removed and replaced with another removable tactile input layer 162 for use with the keyboard sensing hardware structure 165 formed under the sealed input surface 164 and without replacement of the electronics for sensing keypress, touch, and touchless gesture inputs in embodiments herein. By bifurcating the split-keyboard structure into a purely mechanical removable tactile input layer 162 and the keyboard sensing hardware structure 176 formed under the sealed input surface 176, damage to the split-keyboard structure can be limited, from a spill for example, to the removable tactile input layer 162. The electronic devices of the keyboard sensing hardware structure 176 formed under the sealed input surface 176 in split-keyboard structure and the hardware components of the information handling system 100 remain sealed within the sealed input surface 176 and protected from damage. Still further, the split-keyboard structure of the present specification also provides for a swappable removable tactile input layer 162 that allows for repair or replacement of the removable tactile input layer 162 if and when contaminants have been introduced into the mechanical parts of the removable tactile input layer 162.

Even further, the split-keyboard structure of the present specification also provides for a swappable removable tactile input layer 162 that accommodates for different types of keyboard layouts thereby accommodating for various typists who are using the information handling system 100. Because of the layout of the various layers of the split-keyboard structure, the split-keyboard structure may not only operate with the keyboard sensing hardware structure 178 formed under the sealed input surface 176 to recognize tactile input such as a keypress or touch input at the removable tactile input layer 162 but may also recognize when a user's fingers are hovering over the keys of the split-keyboard structure and above those keys in a touchless gesture function. This allows for touchless gestures as well as touch inputs and keypresses to be received at the split-keyboard structure sensed by contactless capacitive sensing with the keyboard sensing hardware structure 176 formed under the sealed input surface 176. Touch input and touchless gestures may include swiping gestures and the like in order to provide various different types of input at the removable tactile input layer 162 of the split-keyboard structure than other keyboards may be capable of receiving. Even further, the dynamic key mapping engine 196 may identify the installed removeable tactile input layer 162 allowing the user to install, swap, and secure any type of removeable tactile input layer 162 to the sealed input surface 176 and immediately proceed to use that removeable tactile input layer 162 for input to the information handling system 100. Still further, the inclusion of the light guide layer 188 at the or a part of the sealed input surface 176 allows for LEDs of an LED layer 178 to provide a backlit keyboard 152 in the split-keyboard structure described herein regardless of the removeable tactile input layer 162 installed. Additionally, the metal keyboard support 198 of the sealed input surface 176, including holes formed under locations of keyboard keys, provides added structural support and strength to the sealed input surface 176 as the top layer of the keyboard chassis while allowing for illumination through the light guide layer 188 from the LED layer 178 formed below the sealed input surface 176 in embodiments herein.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
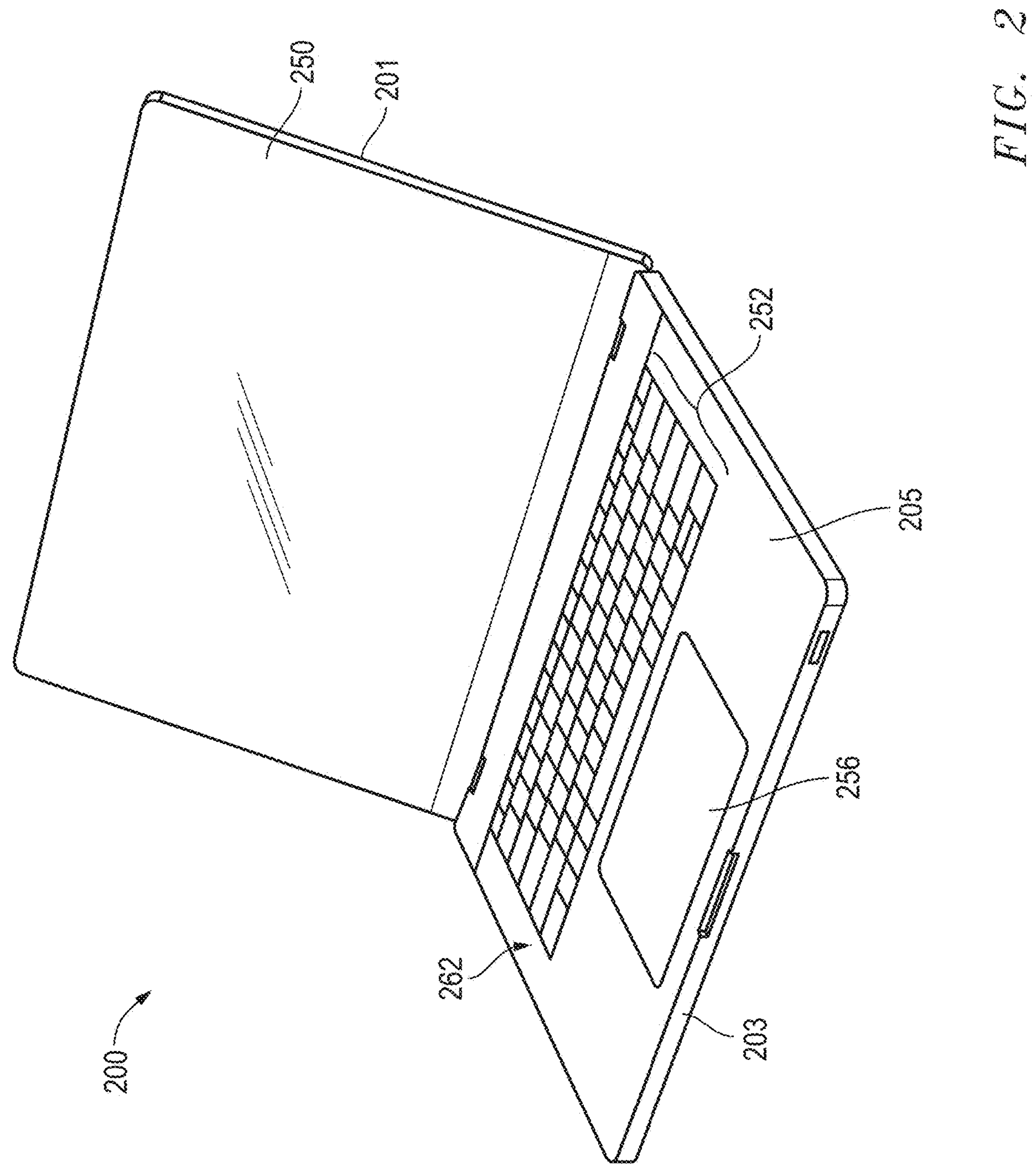
FIG. 2 is a graphic diagram illustrating an information handling system that includes a keyboard having a removable tactile input layer and a separate sealed input surface having a keyboard sensing hardware structure formed under the sealed input surface to receive keyboard, touch, and gesture input from a user according to an embodiment of the present disclosure.

FIG. 2 is a graphic diagram illustrating perspective view of an information handling system 200 that includes a keyboard 252 having a split-keyboard structure that includes a removable tactile input layer 262 and a separate sealed input surface (not shown) having a keyboard sensing hardware structure formed under the sealed input surface to receive keyboard, touch, and gesture input from a user according to an embodiment of the present disclosure. As described herein, the information handling system 200 may be a laptop-type information handling system 200. The laptop-type information handling system 200 may include a base chassis 203, also referred to as a keyboard chassis 203, and a display chassis 201. Therefore, FIG. 2 shows a lid portion of the laptop-type information handling system 200 that is a display chassis 201 that includes a video/graphics display device 250 to provide output to the user and for the user to provide input in those embodiments where the video/graphics display device 250 is a touchscreen display device. The laptop-type information handling system 200 also includes a base chassis 203, hinged to the display chassis 201, that may house information handling system hardware components as described in connection with FIG. 1 as well as various ports. The base chassis 203 in various embodiments further includes the separate keyboard sensing hardware structure formed under a sealed input surface (not shown) of the base chassis 203 and have a separate mechanical removable tactile input layer 262 installed on top of the sealed input surface of the base chassis 203 according to embodiments herein. In an embodiment, portion of the c-cover 205 of the base chassis 203 may include a recessed housing well portion that houses the removable tactile input layer 262 having keyboard 252 as described herein.

In an embodiment, the base portion 203 of the laptop-type information handling system 200 may include the keyboard structure 252 in the removable tactile input layer 262 (shown installed in the recessed housing well) forming a first portion of the split-keyboard structure as described in embodiments herein. FIG. 2 shows the removeable tactile input layer with keyboard 252 that has been coupled or otherwise installed onto a sealed input surface in a recessed housing well as described in connection with FIG. 1. As described herein, the removeable tactile input layer 262 may include a keyboard structure 252 that may be any of a QWERTY-type keyboard layout of a first removeable tactile input layer 162 to other types of keyboard key layouts that include, for example, Dvorak simplified keyboard, a Colemak keyboard, AZERTY keyboard, a QWERTZ keyboard, a Japanese Industrial Standard (JIS) keyboard, Hangul keyboard, and other language-specific layouts, region-specific layouts, task-specific layouts, and specialized keyboard layouts. Each of these different layouts may be detected using various detection devices including dedicated carbon patches, magnets, optical markers, NFC tags, RFID tags and the like that are placed on the underside of the removeable tactile input layer 262 and detectable by sensors placed below the sealed input surface. By detecting the detection devices, the capacitive sensor microprocessor, executing the dynamic key mapping engine, may know the layout of the keys of the attached removable tactile input layer and assign each of the plurality of capacitive sensors in the capacitive pads layer the appropriate input characteristics based on the detected type of keyboard layout on the installed removable tactile input layer. In an embodiment, the removeable tactile input layer 262 may be formed into a recessed housing well within the c-cover 205 of the base chassis (or keyboard chassis) portion 203 of the information handling system.

FIG. 2 also shows a trackpad 256 installed in the base chassis portion 203 of the laptop-type information handling system 200. This trackpad 256 may also be used by the user to provide input to the information handling system 200. In an embodiment, the trackpad 256 may form part of the removable tactile input layer 262 and may operate similarly to those keyboard keys present within the keyboard structure 252 of the removable tactile input layer 262 and be contactlessly detected by the separate keyboard sensing hardware structure formed under a sealed input surface in some embodiments. Alternatively, the trackpad 256 may form a different part of the top layer of the base chassis 203 of the information handling system 200 and may operate independently of the keyboard structure 252 that forms the removable tactile input layer 262 with the removeable tactile input layer 262 being formed into the recessed housing well described herein. In the latter embodiment, the trackpad 256 operates to receive touch and clicks at the surface of the trackpad 256 with the trackpad 256 and includes trackpad electrical circuits to receive that input.

Figure 3A:
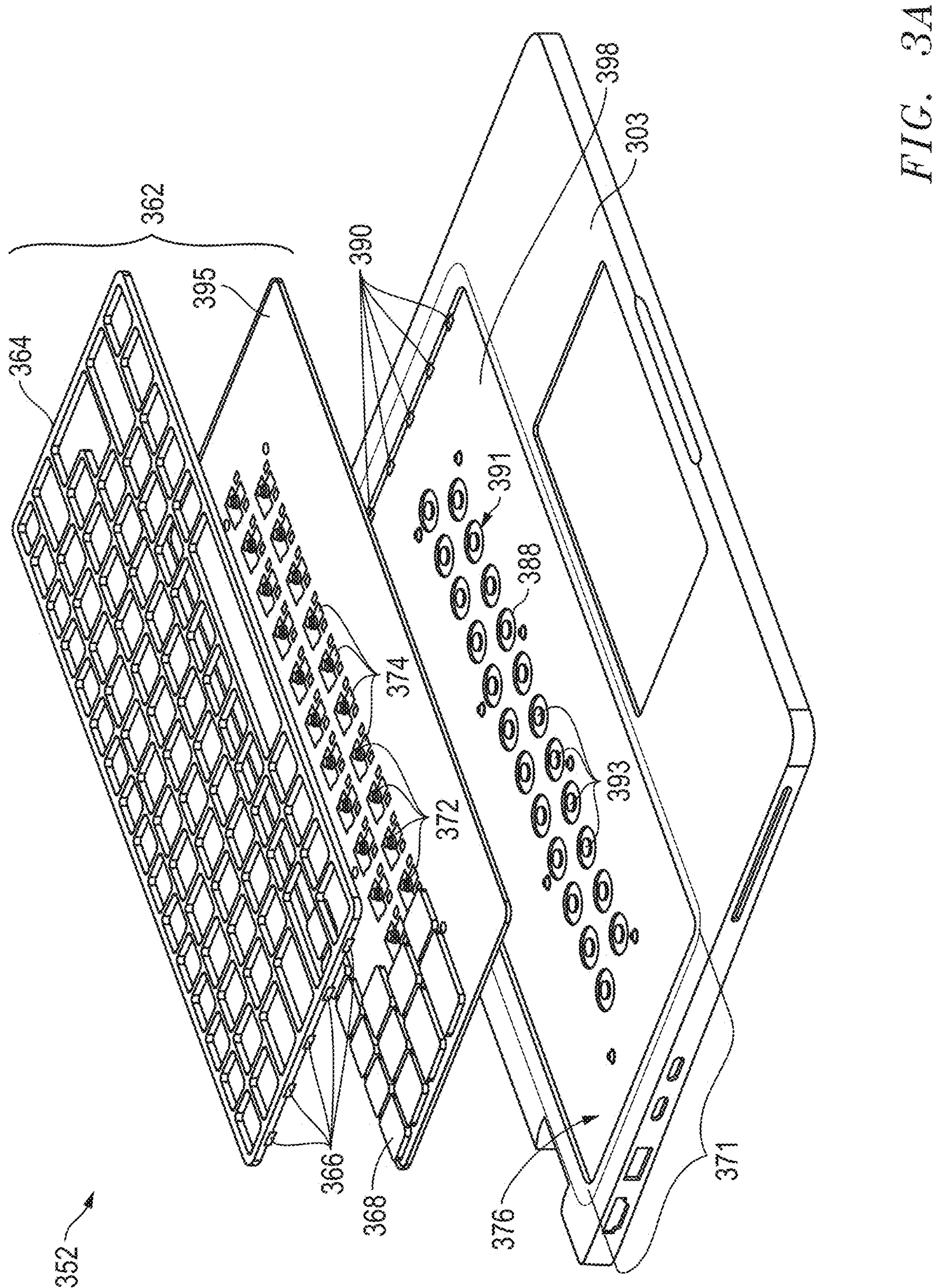
FIG. 3A is an exploded perspective view of a graphic diagram illustrating a split keyboard stack that includes a removable tactile input layer and a separate sealed input surface to receive keyboard, touch, and gesture input from a user contactlessly at capacitive sensor pads in a keyboard sensing hardware structure and a plurality of light emitting diodes (LEDs) formed under the sealed input surface having a metal support plate and a light guide layer according to an embodiment of the present disclosure.
Figure 3B:
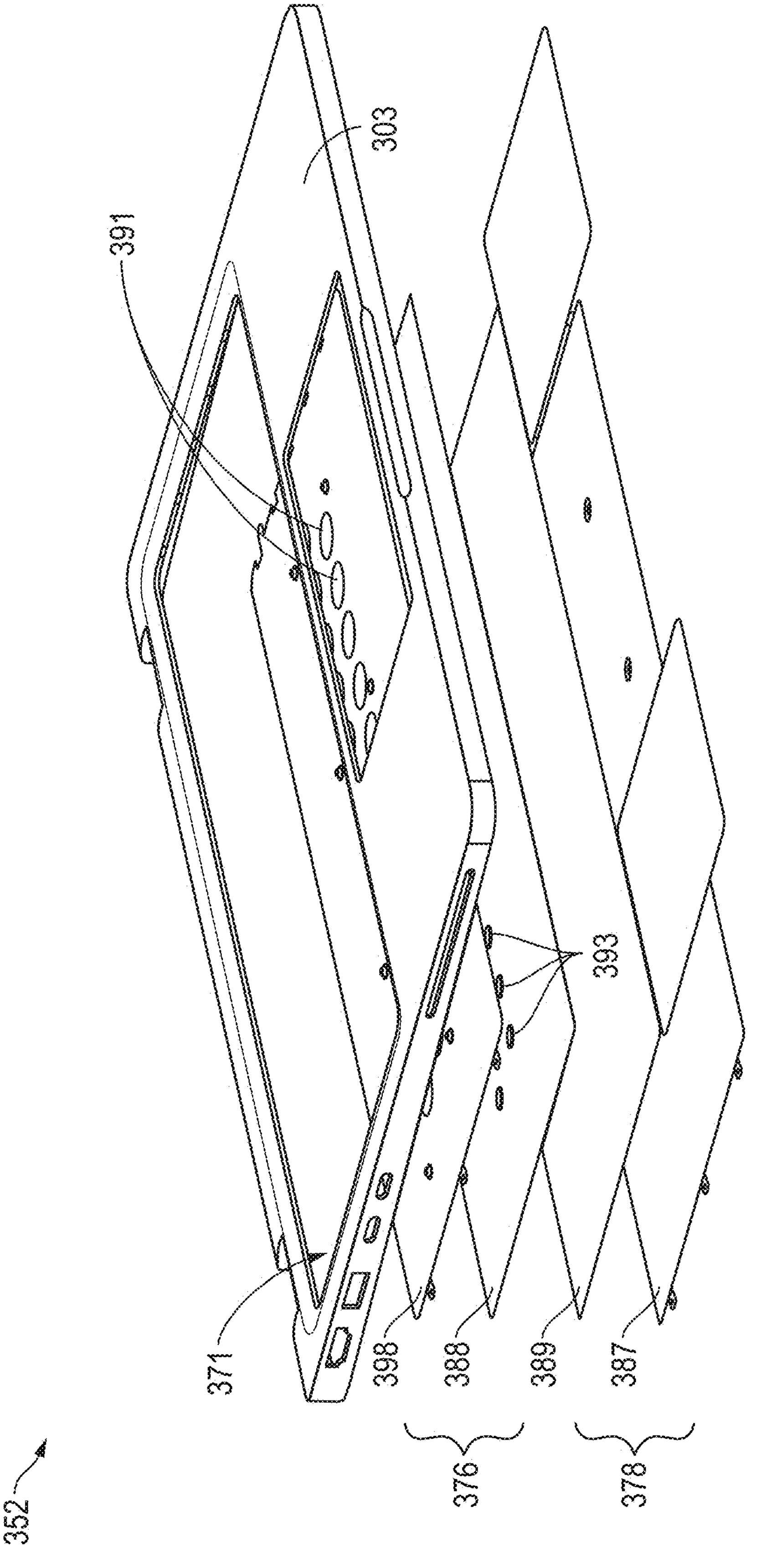
FIG. 3B is an exploded perspective view of a graphic diagram illustrating a split keyboard stack that includes a sealed input surface to receive keyboard, touch, and gesture input from a user contactlessly at capacitive sensor pads in a keyboard sensing hardware structure with a plurality of LEDs formed under the sealed input surface having a metal support plate and a light guide layer according to an embodiment of the present disclosure.

FIG. 3A is an exploded perspective view graphic diagram illustrating a split keyboard stack that illustrates a removable tactile input layer 362 to be installed on a separate sealed input surface 376 having a light guide layer 388 and metal support plate 398 to receive keyboard, touch, and gesture input from a user contactlessly at capacitive sensor pads in a keyboard sensing hardware structure (not shown) formed under the sealed input surface 376 according to an embodiment of the present disclosure. Additionally, FIG. 3B is an exploded perspective view graphic diagram illustrating a split keyboard stack that includes the sealed input surface

Figure 3C:
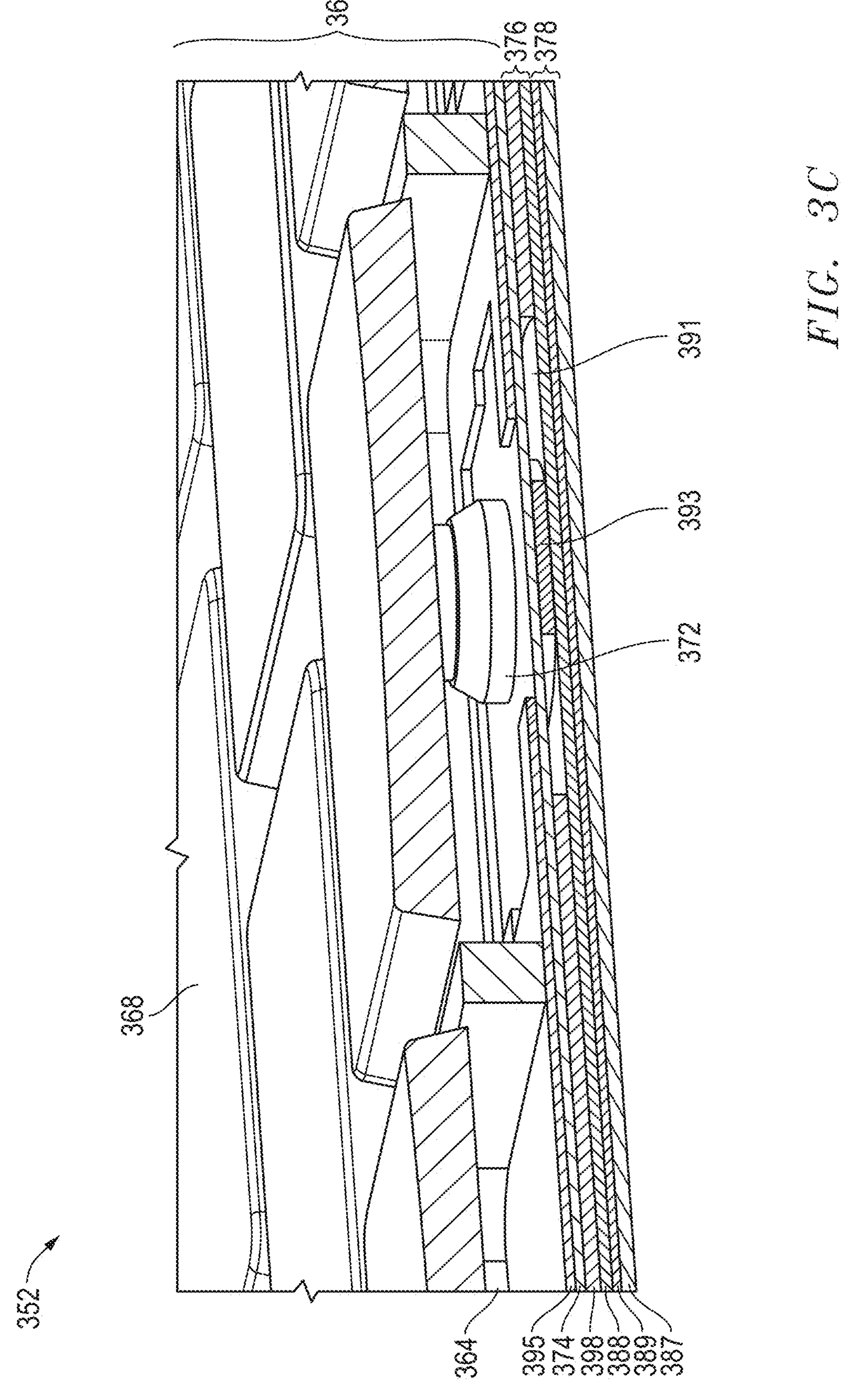
FIG. 3C is a side, section view of a graphic diagram illustrating a split-keyboard stack that includes a removable tactile input layer and a separate sealed input surface to receive keyboard, touch, and gesture input from a user contactlessly at capacitive sensor pads in a keyboard sensing hardware structure and a plurality of LEDs formed under the sealed input surface having a metal support plate and a light guide layer according to an embodiment of the present disclosure.

376 having a light guide layer 388 and metal support plate 398 and the keyboard sensing hardware structure 378 to receive keyboard, touch, and gesture input from a user contactlessly at capacitive sensor pads and having a plurality of light emitting diodes (LEDs) formed under the sealed input surface 376 according to an embodiment of the present disclosure. FIG. 3C is a side, section perspective view graphic diagram illustrating a split-keyboard stack that includes a removable tactile input layer 362 and a separate sealed input surface 376 having a light guide layer 388 and metal support plate 398 with a keyboard sensing hardware structure 378 formed thereunder to receive keyboard, touch, and gesture input from a user contactlessly at capacitive sensor pads and having a plurality of LEDs to illuminate upwards towards the removable tactile input layer 362 according to an embodiment of the present disclosure.

As described herein, the keyboard 352 having the split keyboard stack structure may include a number of layers that form the interface through which the user may provide input to the information handling system. The removeable tactile input layer 362 may be a layer of the first portion of the bifurcated split keyboard stack structure that a user's finger or hand interacts with to provide input to the information handling system and that is formed above a sealed input surface 376. This removeable tactile input layer 362 may include only mechanical elements such as mechanical keyboard keys that provide tactile response to the user when the mechanical keyboard keys are pressed, for example. In the embodiments herein, the removeable tactile input layer 362 may include a keyboard keycap 368 operatively coupled to a keyboard key post (not shown) that interacts with a keyboard key rubber dome 372.

FIGS. 3A and 3C show example embodiments where the removeable tactile input layer 362 is operatively coupled on top of the sealed input surface 374 within a recessed housing well portion 371 of a c-cover for the base chassis 303 of the information handling system. As described herein, the removeable tactile input layer 362 (including a removable lattice 364, a plurality of keyboard keycaps 368, a plurality of keyboard key posts, a plurality of keyboard key rubber domes 372, the rubber dome carrier plate 374, and the scissor device plate and removable tactile input layer support frame 395) may be operatively coupled to the base chassis 303 within a recessed housing well 371 via any latching mechanism, interference fit structures, magnetic structures, or the like to secure the removeable tactile input layer 362 into this recessed housing well 371. In an example embodiment, the lattice structure 364 may include one or more interference fit structures 366 that are formed on an outer, side surface of the lattice structure 364. During assembly by the manufacturer or the user of the information handling system, the interference fit structures 366 formed in lattice 364 may engage with complimentary interference fit structures 390 formed within an edge rim the recessed housing well 371 of the base chassis 303 such that the removeable tactile input layer 362 is selectively coupled with the base chassis 303. In other embodiments, the interference fit structures (not shown) formed on the removable tactile input layer support frame 395 may similarly engage with complimentary interference fit structures 390 formed within an edge rim the recessed housing well 371 of the base chassis 303 such that the removeable tactile input layer 362 is selectively coupled with the base chassis 303. It is appreciated that, instead of mechanically engaging members such as the interference fit structures 366 and the complimentary interference fit structures 390, the removeable tactile input layer 362 may be operatively coupled within the recessed housing well 371 of the base chassis 303 via a set of magnets that are placed within the removeable tactile input layer 362 and the sealed input surface 376 forming a base floor surface of the recessed housing well portion 371 in the base chassis 303 so that the removeable tactile input layer 362 may be selectively retained within the recessed housing well 371 of the base chassis 303 when the magnet pairs magnetically attract towards one another.

FIGS. 3A, 3B, and 3C also show a sealed input surface 376 that includes a light guide layer 388 and a metal keyboard support plate 398. In an embodiment, the light guide layer 388 and a metal support plate 398 may form the sealed input surface 376 that may be placed within the recessed housing well 371 to form a base surface or area within the recessed housing well 371. The recessed housing well 371 is formed within c-cover of the base chassis 303 of the information handling system. The light guide layer 388 and metal support plate 398 are secured as the base floor or surface of the recessed housing well 371 and to the c-cover to form a sealed surface using an adhesive, for example. This light guide layer 388 may serve as, at least, a portion of the sealed input surface 376 as well as a light transmission structure through which light emitted from the LEDs (not shown) formed on a non-conductive keyboard sensing hardware structure substrate 389, for example, and within an LED layer can be transmitted up and into the removeable tactile input layer 362 as described herein. As described herein, the sealed input surface 376 also includes the metal keyboard support plate 398. In order to allow for light transmission, the metal keyboard support plate 398 is placed above the light guide layer 388 may include a plurality of holes 391 through which light emitted from the LEDs may pass. In an embodiment, the holes 391 in this metal keyboard support plate 398 may be placed at locations where light may be passed up towards the keyboard keycaps 368 such that they may illuminate those keys 368 of the keyboard 352. In an alternative embodiment, a hole may be formed below each of the keyboard keys 368 of the keyboard 352 such that each keyboard key 368 is illuminated by the LEDs passing light through the light guide layer 388 of the sealed input surface 376 and the holes 391 in the metal keyboard support plate 398. In an embodiment, the metal keyboard support plate 398 may be fixed to the top surface of the light guide layer 388 such that the holes 391 formed through the metal keyboard support plate 398 do not allow contaminates or liquids to pass into the base housing of the chassis due to the light guide layer 388 being affixed to the bottom surface of the metal keyboard support plate 398.

In an embodiment, a plurality of support spacers 393 may be placed within the holes 391 formed into the metal keyboard support plate 398. These support spacers 393 may have a circumference that is smaller than the holes 391 formed into the metal keyboard support plate 398 such that light from the LEDs may still pass through the holes 391. The support spacers 393 may have a thickness that is similar to that of the metal keyboard support plate 398 such that as the user presses any of the keycaps 368, the pressure on the rubber domes 372 do not bend the rubber dome carrier plate 374 downwards of or flex the light guide layer 388 in the holes 391 of the sealed input surface 376. Instead, the support spacers 393 provide a structural support to the rubber domes 372 on the light guide layer 388 while the metal keyboard support plate 398 may provide structural support for scissor structure under the keycaps of keyboard keys 368 providing a tactile keypress actuation feel for a user using keyboard 352.

As described herein, the LEDs of the LED layer may be one or more mini-LED or micro-LEDs formed on a top surface of a non-conductive keyboard sensing hardware structure substrate 389 such as a multi-layer flexible PCB or a two-sided thin membrane (e.g., a PET membrane). The LEDs formed on the top surface of the non-conductive keyboard sensing hardware structure substrate 389 provide illumination through the transparent or translucent light guide layer 388 of the sealed input surface 376 for the keyboard chassis 303 in, for example, FIGS. 3A and 3C. Additionally, the deposited carbon patches (not shown) of the capacitive pads layer (not shown) may be formed on a top surface of the non-conductive keyboard sensing hardware structure substrate 389 formed below the sealed input surface 376. This places the carbon patches of the capacitive pads layer (not shown) coplanar to the LED layer in some embodiments herein. Again, the location of the deposited carbon patches of the capacitive pads layer directly below the sealed input surface 376 allows for the deposited carbon patches to be located very close to the removeable tactile input layer 362 and the user's fingers and hands. This results in a high press/touch input/no-press differentiation in detection of capacitive changes to the capacitive sensing fields at the deposited carbon patches forming the capacitive sensor pads. The high differentiation in detection of the user's fingers and hands results in a higher signal-to-noise ratio (SNR) that allows a capacitive sensor microprocessor (not shown) executing machine readable code instructions of a capacitive sensor driver (not shown) to operate at a relatively low sensitivity setting. Further, the location of the deposited carbon patches close to the user's fingers and hands also reduces the interference and capacitive radiation that may otherwise be detected at the deposited carbon patches. Still further, this arrangement of the deposited carbon patches of the capacitive pads layer close to the removeable tactile input layer decreases the thickness of the keyboard 352 resulting in a thinner base chassis of the information handling system.

In an embodiment, an adhesive may be used to secure the non-conductive keyboard sensing hardware structure substrate 389 to a bottom surface of the sealed input surface 376 (e.g., a bottom surface of the light guide layer 388) such that the non-conductive keyboard sensing hardware structure substrate 389 does not move during operation and use of the information handling system. This adhesive and the non-conductive keyboard sensing hardware structure substrate 389 may also extend into the palm rest areas on the c-cover of the base chassis 303 in order to add, in some embodiments, additional input surface area across the top surface of the base chassis 303. In an embodiment, those deposited carbon patches of the capacitive pads layer formed on that portion of the non-conductive keyboard sensing hardware structure substrate 389 that extends into the palm rest areas of the base chassis 303 may detect user presence or resting of the user's hands on the c-cover of the base chassis 303.

As described herein, the light guide layer 388 and metal keyboard support plate 398 allow for the light emitted from the LEDs to pass up and into the removeable tactile input layer 362. This allows, at least, for a backlighting effect at the removeable tactile input layer 362 installed into the recessed housing well formed into the base chassis 303. In an embodiment, the LEDs may emit a plurality of different colors of light thereby enhancing the aesthetic qualities of the keyboard 352. In an embodiment, the user may be provided with a user interface at the digital display device (not shown) of the information handling system that allows a user to customize the color of light emitted by the plurality of LEDs within the LED layer (not shown).

As described herein, the non-conductive keyboard sensing hardware structure substrate 389, such as a multi-layer flexible PCB or a two-sided thin membrane (e.g., a PET membrane), may include a second side or additional layers onto which the active shield pads (not shown) of an active shielding layer (not shown) and a grounding layer 387 are formed under. The active shielding layer may shield the plurality of capacitive sensors (e.g., the deposited carbon patches) within the capacitive pads layer from parasitic capacitive grounding by the grounding layer 387. The grounding layer 387 may serve as an EMI shield for internal information handling system hardware components as shown in FIG. 1 within the base chassis 303 and may either form a separate layer or may be part of the non-conductive keyboard sensing hardware structure substrate 389. The active shielding pads within the active shielding layer formed on or within the non-conductive keyboard sensing hardware structure substrate 389 may act as a barrier to parasitic capacitive grounding of the capacitive sensing fields of capacitive sensor pads by extending the ground return path for the capacitive sensing fields around the active shielding pads before returning to the grounding layer 387. Otherwise, the parasitic capacitive grounding by the grounding layer 387 may disrupt the operation of the plurality of capacitive sensor pads of the capacitive pads layer. In an embodiment, the active shielding layer may be operatively coupled to a voltage source as controlled by the capacitive sensor microprocessor such that the voltage level of the active shielding in the active shielding layer is held at about that of the capacitive sensor pads of the capacitive pads layer to prevent grounding of the capacitive sensor pads by the grounding layer. The active shielding layer may be driven using the same voltage as the plurality of capacitive sensor pads within the capacitive pads layer formed on the top surface of the first layer of the non-conductive keyboard sensing hardware structure substrate 389 in some embodiments. This reduces parasitic capacitance between the plurality of capacitive sensor pads of the capacitive pads layer and the grounding layer placed below the active shielding layer. Thus, the active shielding layer further improves SNR and extends capacitive sensing range of the plurality of capacitive sensor pads of the capacitive pads layer in the keyboard sensing hardware structure formed under the sealed input surface 376.

In an embodiment, the grounding layer 387 may provide a stable electrical reference for the active circuitry of the keyboard sensing hardware structure 378 formed under the sealed input surface 376 and help to define signal baseline for a capacitive sensing field at the plurality of capacitive sensor pads of the capacitive pads layer formed on the non-conductive keyboard sensing hardware structure substrate 389 by the capacitive sensor microprocessor. It is appreciated that other hardware components of the information handling system may be placed below the grounding layer 387 that may include an information handling system hardware mainboard that may house a hardware processor, other processing devices, a PMU, a wireless interface adapter, a radio, an RF front end, and an antenna among other hardware components described herein. Thus, the may prevent any EMI and noise from those hardware components also from affecting the operation of the capacitive pads layer as described herein. In an embodiment, the grounding layer may be a grounding layer plate 387 that also provides structural support to the keyboard sensing hardware structure 378 and the base chassis 303.

Figure 4:
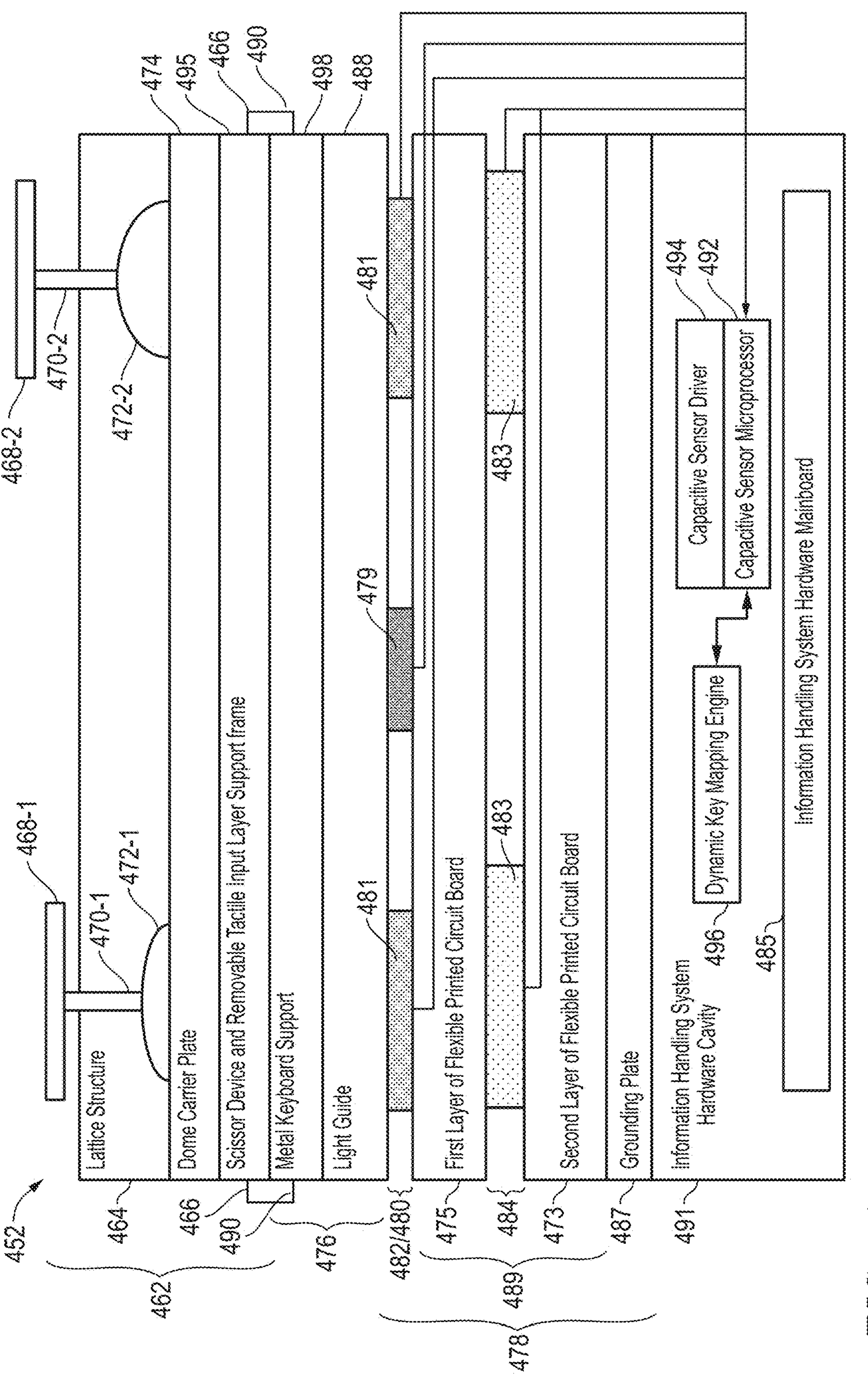
FIG. 4 is a graphic and block diagram illustrating a split keyboard stack that includes removable tactile input layer and a separate sealed input surface to receive keyboard, touch, and gesture input from a user contactlessly at capacitive sensor pads in a keyboard sensing hardware structure and having a plurality of LEDs formed under the sealed input surface having a metal support plate and a light guide layer according to an embodiment of the present disclosure.

FIG. 4 is a graphic and block diagram illustrating a split keyboard stack structure that includes removable tactile input layer 462 and a separate keyboard sensing hardware structure 478 formed under a sealed input surface 476 to receive keyboard, touch, and gesture input from a user contactlessly at capacitive sensor pads 481 and providing illumination via plural LEDs 479 according to an embodiment of the present disclosure. As described herein, the removeable tactile input layer 462 of the keyboard 452 may be placed within a recessed housing well of a c-cover for the display chassis or may form part of a surface of the c-cover of a display chassis of the information handling system.

The keyboard 452 has a split keyboard stack structure which includes a removeable tactile input layer 462 as a first portion of the split keyboard structure and is operatively coupled onto a sealed input surface 476. The split keyboard stack structure may include a second portion having the keyboard sensing hardware structure 478 formed on one or more surfaces or layers of a non-conductive keyboard sensing hardware structure substrate 489 such as a multi-layer flexible PCB or a two-sided thin membrane (e.g., a PET membrane) formed under the sealed input surface 476 in embodiments herein. The removeable tactile input layer 462 may be the layer that a user interacts with to provide user input to the information handling system. This removeable tactile input layer 462 may include only mechanical elements such as mechanical keyboard keys that each includes a keyboard keycap 468-1, 468-2, a keyboard key post 470-1, 470-2, and a keyboard key rubber dome 472-1, 472-2 that provides tactile response to the user when the mechanical keyboard keys are pressed or other I/O interface structures such as a control board, drawing pad, or touch areas. The removeable tactile input layer 462, which may be one among a plurality of swappable and removeable tactile input layer 462, may not have any associated electronics. As such, a user's finger or movement of mechanical keyboard keys may affect capacitance detected in the capacitive sensing field of capacitive sensor pads 481 of the keyboard sensing hardware structure 478 formed under a sealed input surface 476. This may be done, by using a plurality of capacitive sensor pads 481 of a capacitive pads layer 482 formed under the sealed input surface 176 in embodiments herein.

In a specific examples, the removeable tactile input layer 462 may include one or more keyboard keys that each include a keyboard keycap 468-1, 468-2 operatively coupled to a keyboard key rubber dome 472-1, 472-2 or popple via a keyboard key post 470-1, 470-2 forming each of the mechanical keyboard keys. These keyboard keys may be formed in a tray, grid, or other support structure and formed of a suitable material. In an example embodiment, a lattice structure 464 may be placed around the plurality of keyboard keys and may form a layer within the first removable tactile input layer 462. As described herein, the lattice structure 464 may be used to locate and secure the first removable tactile input layer 462 to the keyboard 452 and above the sealed input surface 476.

As described herein, a plurality of removable tactile input layers 462 with various keyboard structure layouts may be installed and operated with the keyboard sensing hardware structure 478 formed under the sealed input surface 476 of the chassis of information handling system in embodiments herein. In this example embodiment, instead of the keyboard key rubber dome 472-1, 472-2 having a switch or activating a switch on a PCB, the keyboard keycap 468-1, 468-2 and keyboard key rubber dome 472-1, 472-2 may be used to help provide location of a keyboard key in the removeable tactile input layer 462 and over the keyboard sensing hardware structure 478 formed under the sealed input surface 476 as well as provide tactile feedback to the user. No physical engagement with keypress sensing electronics is required in the removeable tactile input layer 462 and, accordingly, the removable tactile input layer 462 is easily removable and replaceable for any of a plurality of removable tactile input layers 462 that can be replaced and used with the keyboard sensing hardware structure 478 formed under the sealed input surface 476. In this example embodiment, the removeable tactile input layer 462 may also include scissor or butterfly arms formed on a scissor device plate and removable tactile input layer support frame 495. These scissor or butterfly arms may also provide tactile feedback to the user while facilitating the recoil of the keycap 468 upwards for tactile feedback of a keypress to a user. The scissor device plate and removable tactile input layer support frame 495 also provides a structural frame for the keyboard or other type of removable tactile input layer 462. However, the removable tactile input layer 462 does not include any electrical elements that are used to receive electrical signals as the user presses the keyboard keys. As such, in the embodiments herein, the removable tactile input layer 462 does not include a PCB layer, a flexible PCB layer, or other electrical components that other keyboards may use to detect the press of a keyboard key by the user. Instead, in the embodiments herein, the split-keyboard structure of the keyboard 452 includes the keyboard sensing hardware structure 478 bifurcated under the sealed input surface 476 where those keypress strokes of the keyboard keys on the removable tactile input layer 462 are capacitively detected and, therefore, contactlessly sensed by one or more capacitive sensor pads 481.

In an embodiment, the removeable tactile input layer 462 may further include a dome carrier layer 474. The dome carrier layer 474 may be any surface that allows for light to pass up and into the removeable tactile input layer 462 as well as serve as a structure onto which the keyboard key rubber domes 472-1, 472-2 may be placed. In an example embodiment, the dome carrier layer 474 may be made of a plastic that is transparent or translucent. In an embodiment, the dome carrier layer 474 may be made of a translucent material that scatters or diffuses a light emitted from one or more LEDs 479 of a LED layer 480 formed onto the non-conductive keyboard sensing hardware structure substrate 489 and disposed below the sealed input surface 476. This may create a lighted backlight for the keyboard 452 despite the split-keyboard structure described herein.

In an embodiment, the removeable tactile input layer 462 may further include a lattice structure 464. The lattice structure 464 may be formed around each of the keyboard keycaps 468-1, 468-2 of each keyboard keys on the keyboard 452. In an embodiment, the lattice structure 464 may be made of a rigid material such as a plastic. The removeable tactile input layer 462 may be maintained within the recessed housing well of a c-cover of the base chassis of the information handling system in various embodiments herein such as with the removable tactile input layer support frame 495 and one or more complimentary interference fit structures 466 and 490 or other complementary operative coupling structures (latches, magnets, fasteners or others) between the removable tactile input layer support frame 495 and the recessed housing well or sealed input surface 476 in embodiments herein. In other embodiments, the lattice structure 464 may be used to secure the removeable tactile input layer 462 into a recessed housing well formed into a c-cover of the base chassis of the laptop-type information handling system with interference fit structures 466 or other operative coupling structures as described in embodiments herein. It is appreciated that the lattice structure 464 or the removable tactile input layer support frame 495 may include any latching mechanism, complimentary interference fit structures 466 (with 490), magnetic structures, or the like to secure the removeable tactile input layer 462 into this recessed housing well. As described herein, in specific example embodiments, the lattice structure 464 may include interference fit structures 466 that engages with complementary interference fit structures 490 formed within this recessed housing well such that the interference fit structures 466 may snap the lattice structure 464 and first removable tactile input layer 462 into place when they engage within the complementary interference fit structures 490.

The keyboard sensing hardware structure 478 formed under the sealed input surface 476 may include a plurality of layers used to detect those keypress keystrokes, via capacitive sensing, during actuation of keyboard keys on the removable tactile input layer 462 of the split-keyboard structure above the sealed input surface 476. In an embodiment, the sealed input surface 476 may be sealed such that liquids, dust, and other contaminants cannot enter into the base portion of the information handling system. This prevents those contaminants from damaging those hardware elements formed into the housing of the base portion of the information handling system.

In an example embodiment, the sealed input surface 476 may include a light guide layer 488 formed under a metal keyboard support plate 498 that is used to seal those layers of the keyboard sensing hardware structure 478 to prevent damage due to contaminates and liquids that may be introduced on the first removable tactile input layer 462, albeit accidentally. Further, the metal keyboard support plate 498 may provide added structural strength for the sealed input surface 476 forming the top surface of a keyboard chassis as well as added EMI protection for information handling system hardware formed within the keyboard chassis. In an embodiment, the light guide layer 488 and metal keyboard support plate 498 may be placed within the recessed housing well to form a sealed base surface or floor for the recessed housing well within the c-cover of the base chassis of the information handling system. The light guide layer 488 and metal keyboard support plate 498 of the sealed input surface 476 is secured and sealed to the c-cover using an adhesive, for example, to seal the base floor of the recessed housing well. This light guide layer 488 may serve as, at least, a portion of the sealed input surface 476 as well as a light transmission structure through which light emitted from the LEDs 479 in the LED layer 480 can be transmitted up and into the removeable tactile input layer 462 as described herein. In order to allow for light transmission, the metal keyboard support 498 placed above the light guide layer 488 may include a plurality of holes through which light emitted from the LEDs 479 may pass. In an embodiment, the holes may be placed at locations where light may be passed up towards the keyboard keycaps 468-1, 468-2 such that they may illuminate those keys of the keyboard. In an alternative embodiment, a hole may be formed below each of the keyboard keys of the keyboard such that each keyboard key is illuminated by the LEDs 479 passing light through the light guide layer 488. In an embodiment, the metal keyboard support 498 may be fixed to the top surface of the light guide layer 488 such that the holes formed through the metal keyboard support 498 are covered by the light guide layer 488 of the sealed input surface 476 and do not allow contaminates or liquids to pass into the base chassis housing due to the light guide layer 488 being affixed to the bottom surface of the metal keyboard support 498.

In an example embodiment, the keyboard sensing hardware structure 478 formed under the sealed input surface 476 may include a capacitive pads layer 482. The capacitive pads layer 482 includes a plurality of capacitive sensor pads 481 that may correspond to each or a plurality of the keyboard keys in the removable tactile input layer 462 to detect capacitive changes in a capacitive sensing field due to actuation of those keyboard keys of the removable tactile input layer 462 above the sealed input surface 476 of a chassis of the information handling system. Further, the capacitive pads layer 482 includes a plurality of capacitive sensor pads to detect capacitive changes in a capacitive sensing field due to touch input by a user's fingers on one or more keys or I/O structures on the removable tactile input layer in an embodiment. In yet another embodiment, the capacitive pads layer 482 may include the plurality of capacitive sensor pads 481 that may detect capacitive changes in a capacitive sensing field due to sensing proximate location of the user's body part, including fingers or hand for a touchless gesture, above those keyboard keys of the removable tactile input layer 462 and above the sealed input surface 476 of the keyboard chassis of the information handling system.

In an embodiment, these capacitive sensor pads 481 may be made of deposited carbon pads which may be delicate but are protected and sealed under the sealed input surface 476 (e.g., including the light guide layer 488 and metal keyboard support 498) of the chassis of the information handling system for the keyboard sensing hardware structure 478. The deposited carbon capacitive sensor pads 481 of the capacitive pads layer 482 have a benefit of very low cost and simple manufacturing via deposition or masked spraying to form these deposited carbon capacitive sensor pads 481. In an embodiment, these capacitive sensor pads 481 of deposited carbon may be configured to vary an electric field in response to changes in nearby capacitance. These carbon-based patches of the capacitive sensor pads 481 may be arranged in a sensor matrix of capacitive sensor pads 481 and may be printed, sputtered, or otherwise deposited on a non-conductive keyboard sensing hardware structure substrate 489 such as a two-sided thin membrane (e.g., a PET membrane), an ABS polymer surface, the underside of the light guide layer 488, or on a PCB or, in the example shown in FIG. 4, a multi-layer flexible PCB 475 and 473 at very low cost. In an embodiment, the array of deposited carbon patches for the capacitive sensor pads 481 in the capacitive pads layer 482 may be arranged such that each keyboard key of the removable tactile input layer 462 aligns vertically over the sealed input surface 476 with a deposited carbon patch capacitive sensor pads 481 of the keyboard sensing hardware structure 478 formed under the sealed input surface 476 in embodiments herein. In an alternative embodiment, a single deposited capacitive sensor pad 481 of the capacitive pads layer 482 may be formed under multiple keyboard keys or under a single input device such as a touchpad or trackpad, for example.

In an embodiment, herein, the deposited capacitive sensor pads 481 of the capacitive pads layer 482 may be formed on a top surface of the non-conductive keyboard sensing hardware structure substrate 489, such as a two-sided thin membrane (e.g., a PET membrane), an ABS polymer surface or a first layer of a multi-layer flexible PCB 475 formed below the sealed input surface 476. In an embodiment, the LEDs 479 of the LED layer 178 may also be formed on the top surface of the non-conductive keyboard sensing hardware structure substrate 489 such as a two-sided thin membrane (e.g., a PET membrane), an ABS polymer surface or a first layer of the multi-layer flexible PCB thereby forming a layer within the keyboard sensing hardware structure 478 where the LEDs 479 are coplanar to the deposited capacitive sensor pads 481 of the capacitive pads layer 482.

The location of the deposited capacitive sensor pads 481 of the capacitive pads layer 482 directly below the light guide layer 488 allows for the deposited capacitive sensor pads 481 to be located very close to the removeable tactile input layer 462 and the user's fingers and hands. In an embodiment, the distance between the keyboard keycap 468-1, 468-2 where a user's finger or hand may be detected by the capacitive sensor pads 481 and a sensing support plate 487 formed below the capacitive sensor pads 481 may be around 4-5 mm (e.g., 4.6 mm) thereby creating a capacitive differential that will better detect the presence of the user's hand and fingers even where the fingers and hands are not physically touching the keyboard keycap 468-1, 468-2. This results in a high press/touch input/no-touch differentiation detection of capacitive changes in the capacitive sensing fields at the deposited capacitive sensor pads 481. The high differentiation in detection of the user's fingers and hands results in a higher SNR that allows a capacitive sensor microprocessor 492 executing machine readable code instructions of a capacitive sensor driver 494 to operate at a relatively low sensitivity setting. Further, the location of the deposited capacitive sensor pads 481 close to the user's fingers and hands also reduces the interference and capacitive radiation that may otherwise be detected at the deposited carbon patches. Still further, this arrangement of the deposited capacitive sensor pads 481 of the capacitive pads layer 482 close to the removeable tactile input layer 462 decreases the thickness of the keyboard 452 resulting in a thinner base chassis of the information handling system.

As described in embodiments herein, each of the plurality of capacitive sensor pads 481 in the capacitive pads layer 482 may be operatively coupled to a capacitive sensor microprocessor 492 executing machine readable code instructions of a capacitive sensor driver 494. In an embodiment, each of the deposited capacitive sensor pads 481 that form the plurality of capacitive sensor pads of the capacitive pads layer 482 may be operatively coupled to the capacitive sensor microprocessor 492 via carbon traces formed on the top surface of the non-conductive keyboard sensing hardware structure substrate 489 such as a two-sided thin membrane (e.g., a PET membrane), an ABS polymer surface or a first layer 475 or other layers 473 of a multi-layer flexible PCB. It is also appreciated that other types of traces may be formed to operatively couple the capacitive sensor pads 481 to the capacitive sensor microprocessor 492 executing machine readable code instructions of the capacitive sensor driver 494 such as silver trances, copper traces, and/or ITO that allow each of the deposited capacitive sensor pads 481 to conduct signals to the capacitive sensor microprocessor 492 for determination of a particular keypress of a keyboard key, determination of a user's touch input, and/or determination of a user's touchless gesture input at or near the keyboard keys or other I/O surfaces the removable tactile input layer 462 for the split-keyboard structure. The capacitive sensor driver 494 may be executed by the capacitive sensor microprocessor 492 to detect and determine which of the plurality of keys on the removable tactile input layer 462 have been pressed and detected at each of the plurality of capacitive sensor pads based on location and a detected level of capacitance change. The capacitive sensor microprocessor 492 executing the machine readable code instructions of the capacitive sensor driver 494 may relay these inputs to the hardware processor for processing of keystrokes as input to the information handling system in embodiments herein.

In some embodiments, the keyboard sensing hardware structure 478 may include an active shielding layer 184 to shield the plurality of capacitive sensor pads (e.g., the deposited carbon patches) within the capacitive pads layer 482 from a grounding layer that may include sensing support plate 487 serving as an EMI and grounding surface for the split-keyboard structure. The active shielding layer 484 may also be formed on a second surface of the non-conductive keyboard sensing hardware structure substrate 489 such as a two-sided thin membrane (e.g., a PET membrane), an ABS polymer surface or a layer on the multi-layer PCB 475 or 473. The active shielding layer 484 may act to prevent parasitic capacitive grounding of the capacitive sensing fields by extending the return path for those capacitive sensing fields of the capacitive sensor pads 481 around the active shielding pads 483 before returning to the ground source of the grounding layer 487. Otherwise, the grounding layer 487 that serves as an EMI shield for the keyboard chassis as well as a grounding source for the for the keyboard sensing hardware structure 478 may disrupt the operation of capacitive sensing fields for the plurality of capacitive sensor pads 481 of the capacitive pads layer 482.

In an embodiment, the active shielding layer 484 may be operatively coupled to a voltage source as controlled by the capacitive sensor microprocessor 492 such that the voltage level of the active shielding pads 483 in the active shielding layer 484 is held at about that of the capacitive sensor pads 481 of the capacitive pads layer 480 to prevent grounding of the capacitive sensor pads 481 by the grounding layer 487 (e.g., separate grounding layer 487 or a dedicated layer of the multi-layer flexible PCB below 473). This grounding layer 487 is used for split-keyboard structure grounding and EMI and noise shielding but, due to the thin profile of the keyboard sensing hardware structure 478 formed under the sealed input surface 476, is potentially close to the capacitive pads layer 482 which may disrupt the operation of the plurality of capacitive sensor pads 481 within the capacitive pads layer 482 via parasitically grounding capacitance of those capacitive sensor pads 481 limiting detection of capacitive changes due to user inputs. The active shielding layer 484 may be driven using the same voltage as the plurality of capacitive sensor pads 481 within the capacitive pads layer 482 in some embodiments. This reduces parasitic capacitance between the plurality of capacitive sensor pads 481 of the capacitive pads layer 482 and the grounding layer placed below the active shielding layer 484. Thus, the active shielding layer 484 further improves SNR and extends capacitive sensing range of the plurality of capacitive sensor pads 481 of the capacitive pads layer 482 in the keyboard sensing hardware structure 478 formed under the sealed input surface 476.

As described, in some embodiments, the keyboard sensing hardware structure 478 may also include the grounding layer 487. The grounding layer 487 may also prevent EMI interference with or from hardware components disposed within the keyboard chassis or base chassis of the information handling system. It is appreciated that other hardware components of the information handling system may be placed below the grounding layer 487 in an information handling system hardware cavity 491 in the base chassis or keyboard chassis. Hardware components in the information handling system hardware cavity 491 in the base chassis or keyboard chassis that may include an information handling system hardware mainboard 485 that may house the hardware processor, other processing devices, the PMU, the wireless interface adapter, the radio, the RF front end, and the antenna among other hardware components. Thus, the grounding layer 487 may prevent any EMI and noise from those hardware components in the information handling system hardware cavity 491 in the base chassis or keyboard chassis also from affecting or being affected by the operation of other electronic devices near the information handling system.

In an embodiment, the capacitive sensor microprocessor 492 may execute machine readable code instructions of a dynamic key mapping engine 496. The dynamic key mapping engine 496 may, upon switching types of removeable tactile input layers 462 such that the key layout is different, provide for operation of the newly installed removable tactile input layer 462 with the keyboard sensing hardware structure 478 formed under the sealed input surface 476. By detecting the detection devices, the capacitive sensor microprocessor 492, executing the dynamic key mapping engine 496, may know the layout of the keyboard keys of the installed removable tactile input layer 462 and assign each of the plurality of capacitive sensor pads 481 in the capacitive pads layer 482 the appropriate input characteristics based on the detected type of keyboard layout on the installed removable tactile input layer 462.

The dynamic key mapping engine 496 directs the machine readable code instructions of capacitive sensor driver 494 to be executed by the capacitive sensor microprocessor 492 to detect different capacitive change levels from the capacitive sensor pads 481 to receive and determine various use inputs at or above the removable tactile input layer 462. This may include user inputs including keypress actuations, user touch inputs, and touchless gesture inputs on or above the removable tactile input layer 462 at different ranges of sensed capacitive change levels in embodiments herein. Further, the capacitive sensor driver 464 executed by the capacitive sensor microprocessor 492 may determine locations of received user inputs being translated into corresponding keypress inputs or location inputs for keypress actuations, user touch inputs, and touchless gesture inputs depending on the type of removable tactile input layer 462 detected as installed on the sealed input surface 476 in embodiments herein.

Figure 5A:
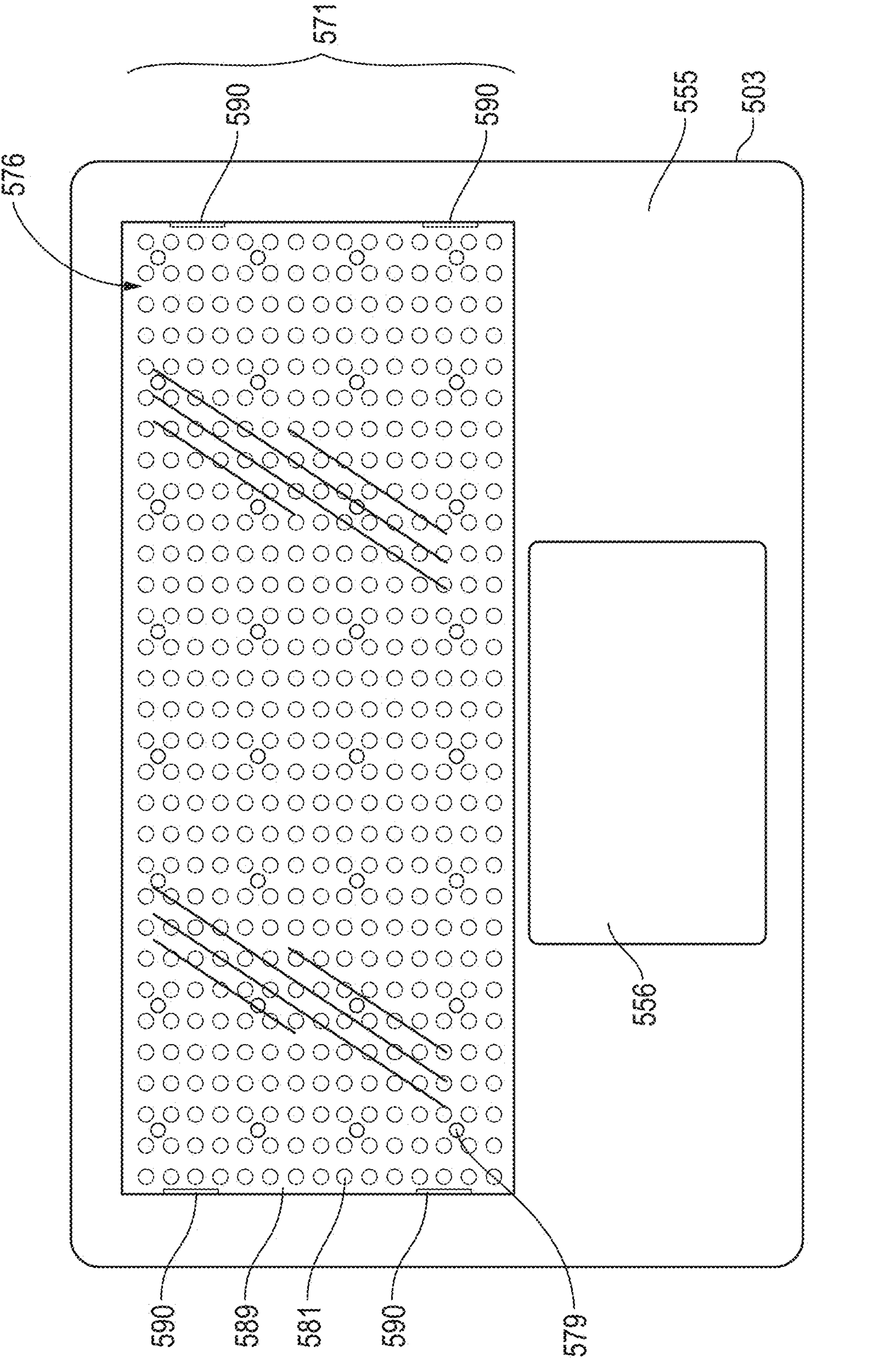
FIG. 5A is a graphic diagram of a keyboard portion of a laptop-type information handling system including a recessed housing well formed in a c-cover of a base chassis of an information handling system to fit and receive a swappable, removable tactile input layer according to an embodiment of the present disclosure.
Figure 5B:
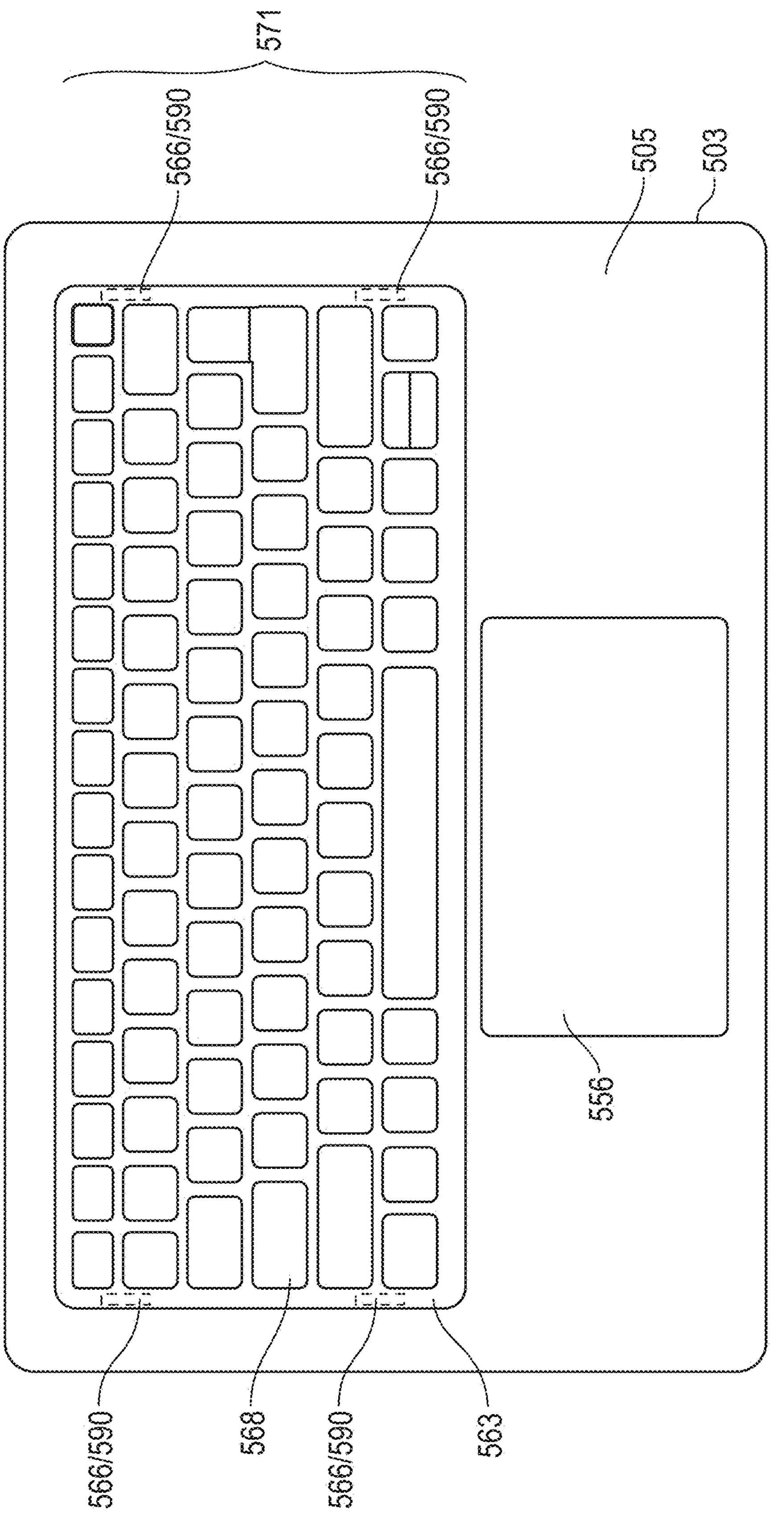
FIG. 5B is a graphic diagram of a keyboard portion of a laptop-type information handling system including a keyboard-type swappable removable tactile input layer placed within a recessed housing well formed in a c-cover of a base chassis of an information handling system according to an embodiment of the present disclosure.

FIG. 5A is a graphic diagram of a keyboard chassis portion of a laptop-type information handling system including a recessed housing well 571 formed in the c-cover 505 of a base chassis 503 of an information handling system to fit and receive a swappable removable tactile input layer (not show) according to an embodiment of the present disclosure. FIG. 5A shows the recessed housing well 571 with a sealed input surface 576, but does not include detail of the light guide layer (e.g., FIG. 4, 488) and the metal keyboard support (e.g., FIG. 4, 498) for the sealed input surface 576 (e.g., as is shown in FIGS. 3A-3C and in FIG. 4). Instead, FIG. 5A shows a potential layout locations of the capacitive sensor pads 581 and LEDs 579 formed onto a non-conductive keyboard sensing hardware structure substrate 589 such as a multi-layer flexible PCB or a two-sided thin membrane (e.g., a PET membrane). Additionally, FIG. 5B is a graphic diagram of a keyboard chassis portion of a laptop-type information handling system including a keyboard-type swappable removable tactile input layer 563 placed within a recessed housing well 571 formed in a c-cover 505 of a base chassis 503 of an information handling system according to an embodiment of the present disclosure. Further, FIG. 4C is a graphic diagram of a keyboard chassis portion of a laptop-type information handling system including a control board-type swappable removable tactile input layer 567 placed within a recessed housing well 571 formed in a c-cover 505 of a base chassis 503 of an information handling system according to an embodiment of the present disclosure. Still further, FIG. 5D is a graphic diagram of a keyboard portion of a laptop-type information handling system including a drawing pad-type swappable removable tactile input layer 569 placed within a recessed housing well 571 formed in a c-cover 505 of a base chassis 503 of an information handling system according to an embodiment of the present disclosure.

It is appreciated that the removable tactile input layers, such as 563, 567 or 569, may be a multipiece or single piece that is operatively coupled on top of a sealed input surface 567 forming a base floor area for a recessed housing well 571 of a c-cover 505 of the base chassis 503. In the examples shown in FIG. 5A through 5D, however, the removeable tactile input layer may any of the keyboard-type removeable tactile input layer 563, a control board-type removable tactile input layer 567, and a drawing pad-type removable tactile input layer 569 that is inserted into the recessed housing well 571 formed within a recessed housing well 571 of the base chassis 503 portion of a laptop-type information handling system. Again, FIG. 5A also shows one example of where the capacitive pad sensors 591 of the capacitive pads layer and LEDs 579 are formed underneath the light guide layer and metal keyboard support plate (not shown) in order to capture changes in the capacitive sensing fields, at any of the removeable tactile input layers 563, 567, 569, via a user key actuation, touch input, or touchless gesture input as described herein. The location of LEDs 579 relative to capacitive sensor pads 581 formed on the non-conductive keyboard sensing hardware structure substrate 589, such as a multi-layer flexible PCB or a two-sided thin membrane (e.g., a PET membrane), may be formed as shown in FIG. 5A in one embodiment. In other embodiments, an LED 579 attributed to each capacitive sensor pad 581 on the non-conductive keyboard sensing hardware structure substrate 589 or to each keyboard key 568 and a hole formed in a metal keyboard support plate (not shown) of the sealed input layer 576. Any layout of LEDs 579 and capacitive sensor pads 581 formed on the non-conductive keyboard sensing hardware structure substrate 589 is contemplated for use under the light guide layer and metal keyboard support plate of embodiments described herein.

In the examples embodiments in FIGS. 5A through 5D, each of the removeable tactile input layers 563, 567, 569 includes a set of interference fit structures 566 and complimentary interference fit structures 590. Because the interference fit structures 566 on the removable tactile input layers 563, 567, and 569 are aligned with the complimentary interference fit structures 590 of the recessed housing well 571, as the removeable tactile input layers 563, 567, 569 are placed within the recessed housing well 571 of the sealed input layer, the interference fit structures 566 and the complimentary interference fit structures 490 interface with each other mechanically to operatively coupled the removeable tactile input layer 563, 567, 569 onto the sealed input surface 576 within the recessed housing well 571.

Figure 5C:
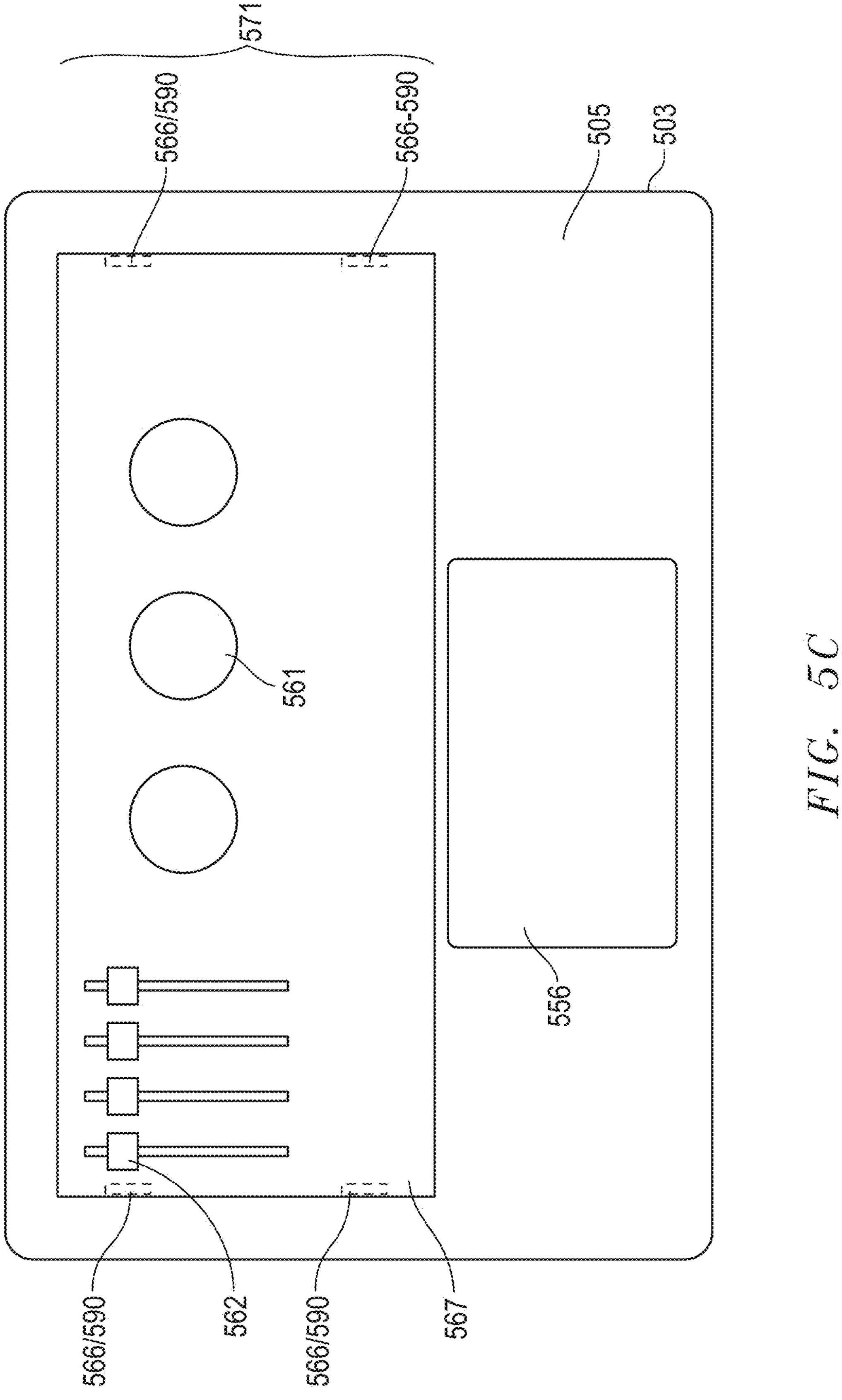
FIG. 5C is a graphic diagram of a keyboard portion of a laptop-type information handling system including a control board-type swappable removable tactile input layer placed within a recessed housing well formed in a c-cover of a base chassis of an information handling system according to an embodiment of the present disclosure.
Figure 5D:
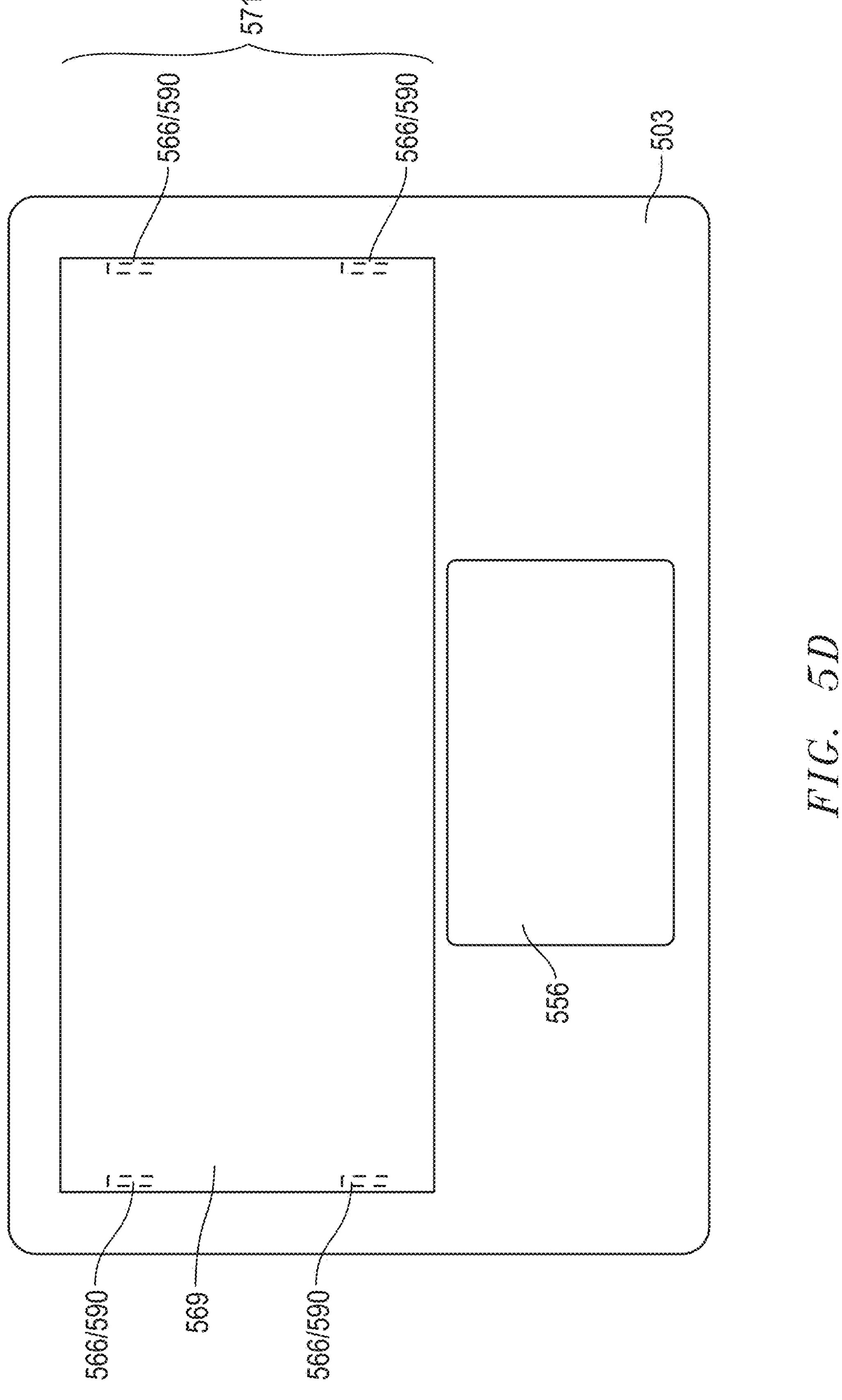
FIG. 5D is a graphic diagram of a keyboard portion of a laptop-type information handling system including a drawing pad-type swappable removable tactile input layer placed within a recessed housing well formed in a c-cover of a base chassis of an information handling system according to an embodiment of the present disclosure.

FIGS. 5B through 5D show individual removeable tactile input layers 563, 567, 569 being placed within the recessed housing well 571 shown in FIG. 5A. FIG. 5B, for example, shows a keyboard-type removeable tactile input layer 563 placed within the recessed housing well 571 having a plurality of keyboard keys 568 and the c-cover 505 having a trackpad 556. As described herein, the keyboard-type removeable tactile input layer 563 includes any number of input keyboard keys 568, with keycaps viewable in FIG. 5B, for the user to acuate and cause a capacitive change in the capacitive sensing field detected via the keyboard sensing hardware structure formed under the sealed input surface 576 described in embodiments herein.

FIG. 5C shows a control board-type removable tactile input layer 567 placed within the recessed housing well 571 shown in FIG. 5A. As described herein, the control board-type removable tactile input layer 567 includes any number of knobs 562 and sliders 561 for the user to acuate and be detected via the keyboard sensing hardware structure formed under the sealed input surface 576 of the keyboard chassis 503 described herein. Additionally, the control board-type removable tactile input layer 567 includes the interference fit structures 566 on a structural support frame for engagement with complimentary interference fit structures 590 as shown FIG. 5A.

FIG. 5D shows a drawing pad-type removable tactile input layer 569 placed within the recessed housing well 571 shown in FIG. 5A. As described herein, the drawing pad-type removable tactile input layer 569 includes a flat surface for the user to interface with a user's finger or a stylus such that the finger or stylus may be detected via the keyboard sensing hardware structure formed under a sealed input surface 576 described herein. Additionally, the drawing pad-type removable tactile input layer 569 includes the interference fit structures 566 to mechanically engage with complimentary interference fit structures 590 shown in FIG. 5A. It is appreciated that each of the base chassis 503 shown in FIGS. 5A through 5D include a trackpad 556 that may be used by the user to provide additional input to the information handling system as well.

Figure 6:
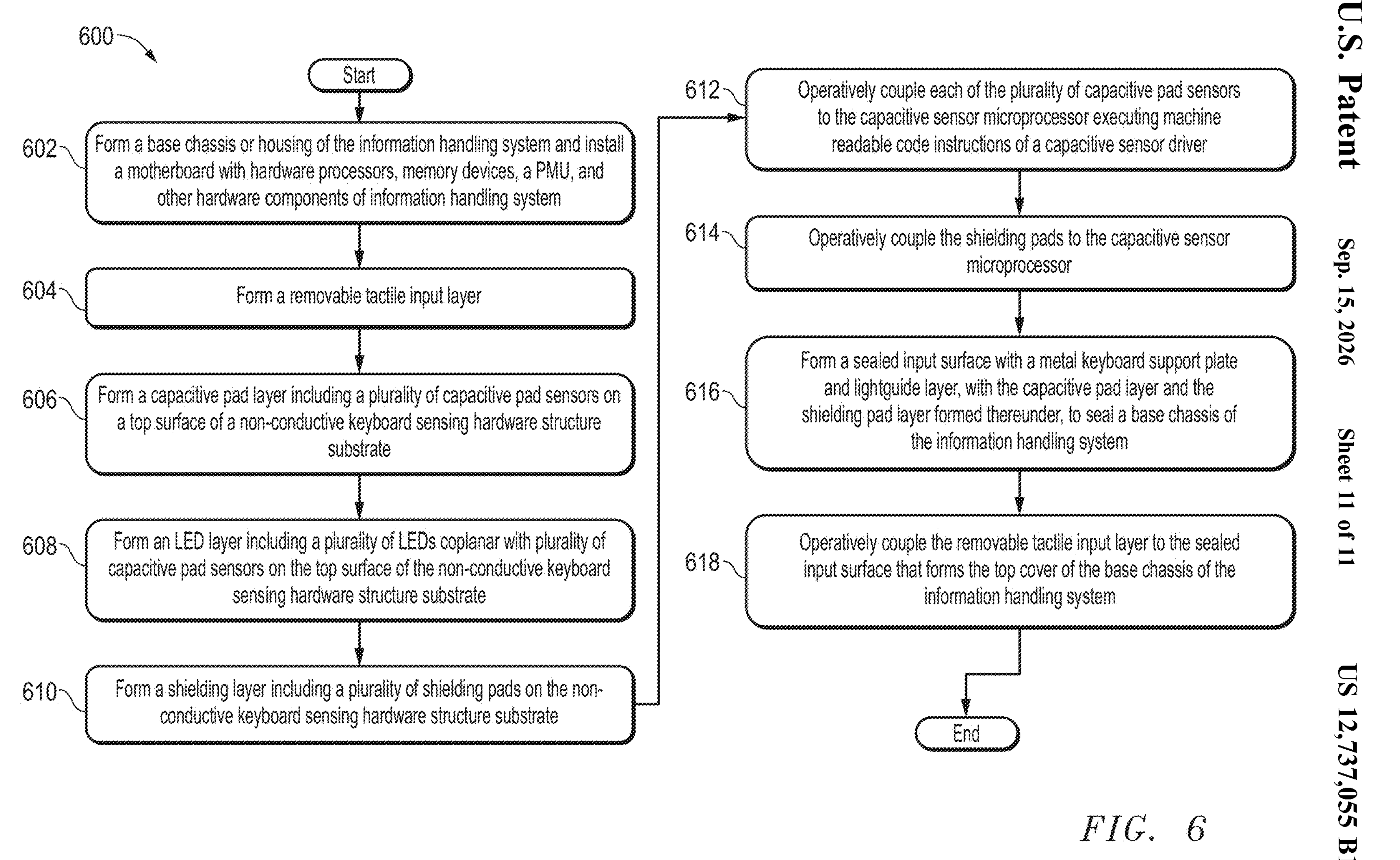
FIG. 6 is a flow diagram showing a method of manufacturing a keyboard that includes a removable tactile input layer and a separate sealed input surface having a metal support plate and a light guide layer with a keyboard sensing hardware structure formed thereunder to receive touch and gesture input from a user and provide illumination according to an embodiment of the present disclosure.

FIG. 6 is a flow diagram showing a method 600 of manufacturing a split keyboard stack that includes a removable tactile input layer and a separate sealed input surface with a lightguide layer and a metal keyboard support plate having a keyboard sensing hardware structure formed thereunder to receive keypress, touch and gesture input from a user according to an embodiment of the present disclosure. The method 600 may include a process to form any of those split keyboard stacks described in connection with, for example, FIGS. 1 through 5D that each include a bifurcated keyboard stack that comprises any replaceable removable tactile input layers and a keyboard sensing hardware structure sealed under a sealed input surface of a base chassis with a capacitive pads layer to contactlessly detect user input above the sealed input surface in various configurations.

At block 602, the method 600 may include forming a base chassis or keyboard chassis housing of the information handling system such as a tray or other support chassis structure and installing a motherboard with hardware processors, memory devices, a PMU, and other hardware components of the information handling system described herein. As described herein, the information handling system may be a laptop-type information handling system that includes a base chassis (or keyboard chassis) portion operatively coupled to a display chassis portion via a hinge. In an embodiment, the other hardware devices may also include fans, port systems, and a battery that may be sized to fit within this base chassis portion with the motherboard. In some embodiments, this step of including information handling system hardware components in the base chassis may occur after formation of the keyboard sensing hardware structure layers under the sealed input surface of the keyboard chassis.

At block 604, the method 600 includes forming a removable tactile input layer. As described herein, the removable tactile input layer may include a keyboard-type removeable tactile input layer, a drawing pad-type removable tactile input layer, or a control board-type removable tactile input layer. The removable tactile input layer may be that layer that a user interacts with to provide input to the information handling system. This removable tactile input layer may include only mechanical elements such as mechanical keys and have keyboard keys formed of key caps, key posts, rubber domes or popples, rubber dome carrier plate, a scissor device plate, scissor structures and the like formed into a keyboard type removable tactile input layer according to embodiments herein, or other I/O surface input interface surfaces as well as dials and sliders or control board input structures that provide tactile response to the user when the mechanical keys are pressed, dials are turned, surfaces are touched, and sliders are moved in other types of removable tactile input layers. As described herein, the removable tactile input layer does not include any electrical elements that are used to receive electrical signals or switch mechanical switches as the user presses the keys, or otherwise interfaces with these other types of input devices. Therefore, in the embodiments herein, the removable tactile input layer does not include a PCB layer, a flexible PCB layer, or other electrical components that other I/O surface input interface surfaces of the removable tactile input layers that may be used to detect user actuation. Instead, in the embodiments herein, the keyboard input layers and other I/O surface input interface surfaces of the removable tactile input layers are operatively coupled to a sealed input surface having a keyboard sensing hardware structure formed underneath to detect strokes of the keys and touch and gesture inputs on or above the removable tactile input layers. A frame of the one or more removable tactile input layers is formed to include magnets, press fit, or interference fit edge structures, latch or fastener structures, as well as tabs, recessed tabs, notches or other structures for coupling and decoupling the removable tactile input layers with the sealed input surface of the keyboard chassis in various embodiments herein.

In an embodiment, the removeable tactile input layer may further include a rubber dome carrier plate. The rubber dome carrier plate may be any surface that allows for light to pass up and into the removeable tactile input layer. In an example embodiment, rubber dome carrier plate may be made of a plastic that is transparent or translucent. In an embodiment, the rubber dome carrier plate may be made of a translucent material that scatters or diffuses a light emitted from one or more LEDs of a LED layer formed below the sealed input surface of the keyboard chassis. This may create a lighted backlight for the keyboard despite the split-keyboard structure described herein.

In an embodiment, the removeable tactile input layer may further include a lattice structure. The lattice structure may be formed around each of the keyboard keycaps of each keyboard keys on the keyboard. In an embodiment, the removable lattice may be made of a rigid material such as a plastic. The lattice structure may be used to secure the removeable tactile input layer into a recessed housing well formed into a c-cover of the base chassis of the laptop-type information handling system such that the removeable tactile input layer may be maintained within the recessed housing well. It is appreciated that the lattice structure may include any latching mechanism, interference fit structures, magnetic structures, or the like to secure the removeable tactile input layer into this recessed housing well.

At block 606, the method 600 further includes forming a capacitive pads layer that includes a plurality of capacitive sensor pads on a non-conductive keyboard sensing hardware structure substrate. In an embodiment, this non-conductive keyboard sensing hardware structure substrate may be a thin two-sided membrane such as a PET membrane, an ABS surface, or a multi-layer flexible PCB as described in connection with FIG. 4 and other embodiments herein, for example. The capacitive sensor pads may be deposited carbon formed onto the non-conductive keyboard sensing hardware structure substrate that is formed below the sealed input surface of the base chassis in embodiments herein. In an embodiment, the non-conductive keyboard sensing hardware structure substrate may be secured to a bottom surface of the sealed input surface. The capacitive pads layer may include a plurality of capacitive sensor pads that have capacitive sensing fields can sense proximate location of the user's finger, hand or body or at least partially conductive structures as capacitive difference levels when the capacitive sensing fields of the capacitive sensor pads are moved within by a user input including with fingers at or above the removable tactile input layer. In an embodiment, the plurality of capacitive sensors may include patches of deposited carbon deposited on the top surface of the non-conductive keyboard sensing hardware structure substrate and configured to detect variation in a capacitive sensing field in response to changes in nearby capacitance from a user input with those deposited carbon capacitance sensor pads. These carbon-based patches may be arranged in a sensor matrix of capacitive sensor pads and may be printed, sputtered, or otherwise deposited on the non-conductive keyboard sensing hardware structure substrate. Further, the arrangement of the capacitive sensor pads may be operatively coupled via conductive traces on or in the non-conductive keyboard sensing hardware structure substrate to one or more capacitive sensing microprocessors and a power source or a ground source in the keyboard chassis. These conductive traces may be within a flexible PCB operatively, on a top surface of a two-sided thin membrane, underneath a sealed input surface (such as a light guide layer), or on or in another non-conductive keyboard sensing structure substrate coupled on the underside of the sealed input surface. These conductive traces may be printed, sputtered, or otherwise deposited on the non-conductive keyboard sensing hardware structure substrate and operatively coupled on the underside of the sealed input surface in embodiments herein.

In an embodiment, the array of deposited carbon patches may be arranged such that each key of a keyboard-type removable tactile input layer aligns vertically with at least one deposited carbon patch. In an embodiment, these deposited carbon patches may be arranged in an array that includes columns and rows of deposited carbon patches although any variety of carbon patches for capacitive sensor pads formed on the underside of the sealed input layer of the base chassis is contemplated.

At block 608, the method 600 also includes forming an LED layer including a plurality of LEDs coplanar with the plurality of capacitive pad sensors on the top surface of the non-conductive keyboard sensing hardware structure substrate. As described herein, the LEDs of the LED layer may be micro-LEDs or mini-LEDs formed into or on the top surface of a multi-layer flexible PCB or a two-sided thin membrane (e.g., a PET membrane) and may illuminate the removable tactile input layer through the transparent or translucent light guide layer of the sealed input surface. Electrical traces made of, for example, silver or copper or other conductive material may be deposited onto the top surface of the non-conductive keyboard sensing hardware structure substrate in order to operatively couple the LEDs to a capacitive sensor microprocessor and a power source as described herein. Because of the disparate voltage requirements for the LEDs and capacitive sensor pads, the electrical trances formed on the non-conductive keyboard sensing hardware structure substrate operatively coupling the capacitive sensor pads to the capacitive sensor microprocessor may be made of a different material such as carbon or the same material in various embodiments.

The method 600, at block 610, further includes forming a shielding layer that includes a plurality of shielding pads on a non-conductive keyboard sensing hardware structure substrate placed below the capacitive pads layer. In an embodiment, the non-conductive keyboard sensing hardware structure substrate may include a second side of a thin two-sided membrane or a second side or layer of multi-layer flexible PCB as described in connection with embodiments herein. The shielding layer may include a plurality of active shielding pads that form a shielding layer and installed vertically below each of the capacitive sensor pads. Each of the active shielding pads of the shielding layer may act to shield the plurality of capacitive sensors within the capacitive pads layer to prevent parasitic grounding of the capacitive sensor pads by a grounding layer formed below the shielding pads. The grounding layer is formed to provide EMI shielding to information handling system components within the keyboard chassis as well as to ground the keyboard sensing hardware structure. In an embodiment, these active shielding pads may be driven using the same or a similar voltage as the plurality of capacitive sensor pads within the capacitive pads layer. This reduces parasitic grounding of capacitance between the plurality of capacitive sensor pads of the capacitive pads layer and the grounding layer placed below the shielding layer by requiring the capacitive sensing field of the capacitive sensing pads to extend around the active shielding pads before reaching the grounding source of the grounding layer. These active shielding pads of the active shielding layer improves SNR and extends the sensing range of the plurality of capacitive sensors of the capacitive pads layer for detecting capacitive changes of keypress actuations, touch inputs, or gesture inputs. Indeed, in an embodiment, the active shielding pads allow a user to provide input such as gesture input even when the user is not in physical contact with any of the keys of the capacitive sensor pads of the capacitive pads layer. This is because the capacitive sense capabilities of the capacitive sensor pads is extended a distance above the surface of the removable tactile input layer due to the inclusion of the active shielding pads of the shielding layer.

At block 612, the method 600 includes operatively coupling the plurality of capacitive sensor pads to the capacitive sensor microprocessor executing machine readable code instructions of a capacitive sensor driver. The capacitive sensor pads are operatively coupled to the capacitive sensor microprocessor via one or more conductive traces formed on the non-conductive keyboard sensing hardware structure substrate in one embodiment. In some embodiments, conductive traces of a flexible PCB may be attached and electrically coupled to the deposited carbon patches of the capacitive sensor pads on the flexible PCB that forms the non-conductive keyboard sensing hardware structure substrate to electrically couple the plurality of capacitive sensor pads to the capacitive sensor microprocessor. In other embodiments, conductive traces may be deposited onto a two-sided membrane, such as a PET membrane, to electrically couple the deposited carbon patches of the capacitive sensor pads on the thin two-sided membrane that forms the non-conductive keyboard sensing hardware structure substrate to the capacitive sensor microprocessor.

The capacitive pad sensor pads and shielding pads are driven at a voltage by the capacitive sensing microprocessor and a power source such that the capacitive sensor pads detect changes in capacitance at the removable tactile input layer in a gesture detection mode according to embodiments herein. The shielding pads are driven at a similar or same voltage to shield parasitic capacitance grounding of the capacitive sensor pads by the grounding layer formed below the shielding pads.

The capacitive sensor driver is also operatively coupled to a capacitive sensor microprocessor to process input the user provides at the removable tactile input layer and detected at the capacitive sensor pads. As described herein, the capacitive sensor driver may be executed by a capacitive sensor microprocessor to detect and determine which of the plurality of keys, dials, sliders, and surfaces on the removable tactile input layers have been actuated or interfaced with and detected at each of the plurality of capacitive sensor pads. The capacitive sensor microprocessor executing machine readable code instructions of the capacitive sensor driver may relay these inputs to the hardware processor for processing of keystrokes, touch inputs, or gestures as input to the information handling system.

In an embodiment, the capacitive sensor microprocessor may execute machine readable or machine readable program code instructions of a dynamic key mapping engine. The dynamic key mapping engine may allow a user to switch types of removable tactile input layers such that the key layout is different. For example, a user may switch from a QWERTY-type keyboard layout of a first removable tactile input layer to other types of keyboard key layouts. Each of these different layouts may be detected using various detection devices including dedicated carbon patches, magnets, optical markers, NFC tags, RFID tags and the like that are placed on the underside of the removable tactile input layer and detectable by sensors placed below the sealed input surface. By detecting the detection devices, the capacitive sensor microprocessor, executing the dynamic key mapping engine, may know the layout of the keys of the attached removable tactile input layer and assign each of the plurality of capacitive sensor pads in the capacitive pads layer the appropriate input characteristics based on the detected type of keyboard layout on the installed removable tactile input layer.

At block 614, the method 600 also includes operatively coupling the shielding pads to the capacitive sensor microprocessor. As described above, the shielding pads are operatively coupled to the capacitive sensor microprocessor via conductive traces in or on the non-conductive keyboard sensing hardware structure substrate. The capacitive sensing microprocessor may be formed on a PCB in the information handling system hardware cavity of the base chassis of the information handling system in an embodiment and the shielding pads are formed on the non-conductive keyboard sensing hardware structure substrate, for example on a second surface or second layer under the capacitive sensor pads of the capacitive pads layer. The Active shielding pads of the active shielding layer are electrically coupled to the capacitive sensing microprocessor and a power source or ground via conductive traces, such as silver, copper, silver carbon, or other deposited on for formed into the non-conductive keyboard sensing hardware structure substrate, such as a two-sided membrane (e.g., a PET membrane) or a multilayer flexible PCB.

At block 616, the method 600 may include forming the sealed input surface having the capacitive sensor pads and any conductive traces deposited on non-conductive keyboard sensing hardware structure substrate with the shielding layer and a grounding layer underneath the bottom side of the sealed input surface of the base chassis of the information handling system. This sealed input surface may be sealed to, for example, form a top surface of a base chassis housing of the information handling system such that the sealed input surface seals the remaining portions of the base chassis housing of the information handling system and any information handing system hardware components as well as the layers of the keyboard sensing hardware structure from contaminates and liquids. In other embodiments, the sealed input surface may be sealed to a c-cover of the base chassis to form a base floor surface of a recessed housing well formed into the c-cover of the base chassis of an information handling system.

As described herein, the sealed input surface may include a light guide layer and a metal keyboard support plate. In an example embodiment, the sealed input surface may include a light guide layer formed under a metal keyboard support plate that is used to seal those layers of the keyboard sensing hardware structure to prevent damage due to contaminates and liquids that may be introduced on the first removable tactile input layer, albeit accidentally. In an embodiment, the light guide layer may be placed within the recessed housing well to form the base floor surface of the recessed housing well within the c-cover of the base chassis of the information handling system. The light guide layer formed under the metal keyboard support plate of the sealed input surface may be secured to the c-cover using an adhesive, for example. This light guide layer may serve as, at least, a portion of the sealed input surface as well as a light transmission structure through which light emitted from the LEDs in the LED layer can be transmitted up and into the removeable tactile input layer as described herein. In order to allow for light transmission, the metal keyboard support placed above the light guide layer may include a plurality of holes through which light emitted from the LEDs may pass. In an embodiment, the holes may be placed at locations where light may be passed up through the light guide layer under those holes and towards the keyboard keycaps such that they may illuminate those keys of the keyboard. In an embodiment, a hole may be formed below each of the keyboard keys of the keyboard such that each keyboard key is illuminated by the LEDs passing light through the light guide layer. In an embodiment, the metal keyboard support may be fixed to the top surface of the light guide layer such that the holes formed through the metal keyboard support plate with the light guide layer underneath do not allow contaminates or liquids to pass into the base housing of the chassis due to the light guide layer being affixed to the bottom surface of the metal keyboard support.

In an embodiment, the keyboard may be completed by operatively coupling the removable tactile input layer, selected from a plurality of available removable tactile input layers including various removable keyboard layouts, a removable control board input layer, or a removable drawing surface input layer to the sealed input surface that forms the top cover of the base chassis of the information handling system or a floor base surface of a recessed housing well in a c-cover at block 618. In an embodiment, the removable tactile input layer may be operatively coupled to the sealed input surface using press fit or interference fit structures, a latching mechanism, a fastener, a coupling device such as a magnetic coupling device or an adhesive layer. This adhesive layer may include any type of glue, tape, or other adhesive that may, at least temporarily, adhere the bottom surface of the removable tactile input layer to a top surface of the sealed input surface that includes a capacitive pads layer as a top layer. In other embodiments, the removeable tactile input layer may be coupled to the sealed input surface using reciprocal press fit or interference fit structures, fasteners, a latching mechanisms, or sets of magnets on the removable tactile input layer and the sealed input surface respectively as described herein. At this point the method 600 may end with the keyboard being formed in, for example, a base portion of a laptop-type information handling system.

The blocks of the flow diagrams of FIG. 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system having a keyboard with a split keyboard structure comprising:

a hardware processor, a data storage device, and a power management unit (PMU) to provide power to the hardware processor and data storage device formed in a keyboard chassis of the information handling system;

the split keyboard structure including a first removable tactile input layer to receive user input and formed on top of a sealed input surface of the keyboard chassis, wherein the first removable tactile input layer structure is removable from the split keyboard structure and replaceable with a second removable tactile input layer structure without replacing a keyboard sensing hardware structure formed below the sealed input surface;

the split keyboard structure including a keyboard sensing hardware structure formed onto a non-conductive keyboard sensing hardware structure substrate below the sealed input surface of the keyboard chassis to detect capacitive changes in a capacitive sensing field of a plurality of capacitive pad sensors from user input above the sealed input surface and on or above the first removable tactile input layer, wherein the keyboard sensing hardware structure includes the plurality of capacitive pad sensors in a capacitive pads layer, a light-emitting diode (LED) layer comprising a plurality of LEDs, and a plurality of active shielding pads in an active shielding layer; and the sealed input surface of the keyboard chassis includes a light guide layer and a metal support plate having a plurality of holes bonded to a top surface of the light guide layer and formed over the keyboard sensing hardware structure to transmit light from the plurality of LEDs upwards into the first removable tactile input layer, wherein the sealed input surface seals the keyboard sensing hardware structure in the keyboard chassis from contaminants.

2. The information handling system of claim 1 further comprising:

the non-conductive keyboard sensing hardware structure substrate is a multi-layer flex printed circuit board (PCB) operatively coupled to a bottom surface of the light guide layer of the sealed input surface and the plurality of capacitive sensors and the LEDs are formed on a first layer of the multi-layer flex PCB and the plurality of shielding pads are formed on a second layer of the multi-layer flex PCB.

3. The information handling system of claim 1 further comprising:

the plurality of LEDs of the LED layer are formed on a top surface of the non-conductive keyboard sensing hardware structure substrate and are coplanar to the plurality of capacitive sensor pads of the capacitive pads layer.

4. The information handling system of claim 1 further comprising:

a grounding layer formed below the active shielding layer of the keyboard sensing hardware structure to shield the plurality of information handling system hardware components disposed within the keyboard chassis from electromagnetic interference (EMI).

5. The information handling system of claim 1, wherein the plurality of holes formed in the metal support plate align vertically with a plurality of keyboard keys of the first removable tactile input layer.

6. The information handling system of claim 1, wherein each of the plurality of capacitive pad sensors are operatively coupled to a capacitive sensor microprocessor via conductive carbon ink traces formed on the non-conductive keyboard sensing hardware structure substrate and the plurality of LEDs are operatively coupled to the capacitive sensor microprocessor via metallic traces formed on the non-conductive keyboard sensing hardware structure substrate.

7. The information handling system of claim 1 further comprising:

a recessed housing well formed in a top cover of the keyboard chassis of the information handling system for receiving the first removable tactile input layer of the split keyboard structure among a plurality of removable tactile input layers wherein the recessed housing well includes an edge rim portion and a base floor that is the sealed input surface of the keyboard chassis.

8. The information handling system of claim 1 further comprising:

a lattice structure comprising interference fit structures that snap into complimentary interference fit structures formed within a recessed housing well formed in a top cover of the keyboard chassis of the information handling system to secure the first removable tactile input layer with sealed input layer of the split keyboard structure.

9. The information handling system of claim 1, wherein the plurality of capacitive pad sensors are carbon pads sputter coated onto a surface of the non-conductive keyboard sensing hardware structure substrate and disposed vertically below each of a plurality of keyboard keys of the first removable tactile input layer structure.

10. An information handling system having a keyboard with a split keyboard structure comprising:

a hardware processor, a data storage device, and a power management unit (PMU) to provide power to the hardware processor and data storage device formed in a keyboard chassis of the information handling system;

the split keyboard structure including a first removable tactile input layer to receive user input and formed on top of a sealed input surface of the keyboard chassis, wherein the first removable tactile input layer structure is removable from the split keyboard structure and replaceable with a second removable tactile input layer structure without replacing a keyboard sensing hardware structure formed below the sealed input surface;

the split keyboard structure including a keyboard sensing hardware structure formed onto a non-conductive keyboard sensing hardware structure substrate below the sealed input surface of the keyboard chassis to detect capacitive changes in a capacitive sensing field of a plurality of capacitive pad sensors from user input above the sealed input surface and on or above the first removable tactile input layer, wherein the keyboard sensing hardware structure includes the plurality of capacitive pad sensors in a capacitive pads layer and a light-emitting diode (LED) layer comprising a plurality of LEDs formed coplanar with the capacitive pad sensors of the capacitive pads layer on a top surface of the non-conductive keyboard sensing hardware structure substrate, and a plurality of active shielding pads in an active shielding layer on a second surface of the non-conductive keyboard sensing hardware structure substrate; and the sealed input surface of the keyboard chassis includes a light guide layer and a metal support plate having a plurality of holes bonded to a top surface of the light guide layer and formed over the keyboard sensing hardware structure to transmit light from the plurality of LEDs upwards into the first removable tactile input layer, wherein the sealed input surface seals the keyboard sensing hardware structure in the keyboard chassis from contaminants.

11. The information handling system of claim 10 further comprising:

the non-conductive keyboard sensing hardware structure substrate is a multi-layer flex printed circuit board (PCB) operatively coupled to a bottom surface of the light guide layer of the sealed input surface and the plurality of capacitive sensors and the LEDs are formed on the top surface of a first layer of the multi-layer flex PCB and the plurality of shielding pads are formed on a second layer of the multi-layer flex PCB.

12. The information handling system of claim 10 further comprising:

the non-conductive keyboard sensing hardware structure substrate is a thin two-sided membrane operatively coupled to a bottom surface of the light guide layer of the sealed input surface and the plurality of capacitive sensors and the LEDs are formed on the top surface of the thin two-sided membrane and the plurality of shielding pads are formed on a second opposite surface of the thin two-sided membrane.

13. The information handling system of claim 10 further comprising:

a grounding layer formed below the active shielding layer of the keyboard sensing hardware structure to shield the plurality of information handling system hardware components disposed within the keyboard chassis from electromagnetic interference (EMI).

14. The information handling system of claim 1, wherein the plurality of holes formed in the metal support plate align vertically with a plurality of keyboard keys of the first removable tactile input layer.

15. The information handling system of claim 10, wherein each of the plurality of capacitive pad sensors are carbon pads sputter coated onto the top surface of the non-conductive keyboard sensing hardware structure substrate and operatively coupled to a capacitive sensor microprocessor via conductive carbon traces formed on the non-conductive keyboard sensing hardware structure substrate and the plurality of LEDs are operatively coupled to the capacitive sensor microprocessor via metallic traces formed on the non-conductive keyboard sensing hardware structure substrate.

16. The information handling system of claim 10 further comprising:

a recessed housing well formed in a top cover of the keyboard chassis of the information handling system for receiving the first removable tactile input layer of the split keyboard structure among a plurality of removable tactile input layers wherein the recessed housing well includes an edge rim portion and a base floor that is the sealed input surface of the keyboard chassis.

17. An information handling system having a keyboard with a split keyboard structure comprising:

a hardware processor, a data storage device, and a power management unit (PMU) to provide power to the hardware processor and data storage device formed in a keyboard chassis of the information handling system;

a recessed housing well formed in a top cover of the keyboard chassis of the information handling system for receiving a first removable tactile input layer of the split keyboard structure among a plurality of removable tactile input layers wherein the recessed housing well includes an edge rim portion and a base floor that is a sealed input surface of the keyboard chassis, wherein the first removable tactile input layer to receive user input on or above the first removable tactile input layer and is removable from the split keyboard structure and replaceable with a second removable tactile input layer structure without replacing a keyboard sensing hardware structure formed below the sealed input surface;

the split keyboard structure including the keyboard sensing hardware structure formed onto a non-conductive keyboard sensing hardware structure substrate below the sealed input surface of the keyboard chassis to detect capacitive changes in a capacitive sensing field of a plurality of capacitive pad sensors from user input above the sealed input surface, wherein the keyboard sensing hardware structure includes the plurality of capacitive pad sensors in a capacitive pads layer, a light-emitting diode (LED) layer comprising a plurality of LEDs, and a plurality of active shielding pads in an active shielding layer; and the sealed input surface of the keyboard chassis includes a light guide layer and a metal support plate having a plurality of holes bonded to a top surface of the light guide layer and formed over the keyboard sensing hardware structure to transmit light from the plurality of LEDs upwards into the first removable tactile input layer, wherein the sealed input surface seals the keyboard sensing hardware structure in the keyboard chassis from contaminants.

18. The information handling system of claim 17 further comprising:

the plurality of LEDs of the LED layer are formed on a top surface of the non-conductive keyboard sensing hardware structure substrate and are coplanar to the plurality of capacitive sensor pads of the capacitive pads layer; and the plurality of holes formed in the metal support plate align vertically with a plurality of keyboard keys of the first removable tactile input layer.

19. The information handling system of claim 17 further comprising:

a lattice structure comprising interference fit structures that snap into complimentary interference fit structures formed within the recessed housing well formed in the top cover of the keyboard chassis of the information handling system to secure the first removable tactile input layer with sealed input layer of the split keyboard structure.

20. The information handling system of claim 17 further comprising:

a removable tactile input layer support frame structure comprising interference fit structures that snap into complimentary interference fit structures formed within the recessed housing well formed in the top cover of the keyboard chassis of the information handling system to secure the first removable tactile input layer with sealed input layer of the split keyboard structure.

* * * * *